US006879842B2

(12) United States Patent
King et al.

(10) Patent No.: US 6,879,842 B2
(45) Date of Patent: Apr. 12, 2005

(54) FOLDABLE WIRELESS COMMUNICATION DEVICE FUNCTIONING AS A CELLULAR TELEPHONE AND A PERSONAL DIGITAL ASSISTANT

(75) Inventors: John J. King, Wheaton, IL (US); Christina J. King, Wheaton, IL (US)

(73) Assignee: Lavaflow, LLP, Wheaton, IL (US)

( * ) Notice: Subject to any disclaimer, the term of this patent is extended or adjusted under 35 U.S.C. 154(b) by 69 days.

(21) Appl. No.: 10/307,862

(22) Filed: Dec. 2, 2002

(65) Prior Publication Data

US 2004/0067769 A1 Apr. 8, 2004

Related U.S. Application Data

(60) Provisional application No. 60/384,942, filed on May 31, 2002, and provisional application No. 60/389,814, filed on Jun. 19, 2002.

(51) Int. Cl.[7] .................................................. H04M 1/00
(52) U.S. Cl. ................................ 455/550.1; 455/556.1; 455/556.2; 455/566
(58) Field of Search .......................... 455/550.1, 556.1, 455/556.2, 558, 563, 566, 575.1, 575.3, 73, 90.2, 90.3

(56) References Cited

U.S. PATENT DOCUMENTS

| | | | |
|---|---|---|---|
| 5,189,632 A | | 2/1993 | Paajanen et al. |
| 5,768,164 A | * | 6/1998 | Hollon, Jr. .................. 708/174 |
| 5,797,089 A | | 8/1998 | Nguyen |
| 5,848,356 A | | 12/1998 | Jambhekar et al. |
| 5,966,671 A | * | 10/1999 | Mitchell et al. .......... 455/550.1 |
| 5,991,644 A | | 11/1999 | Ogawa |
| 6,085,112 A | | 7/2000 | Kleinschmidt |
| 6,125,286 A | | 9/2000 | Jahagirdae et al. |
| 6,131,017 A | | 10/2000 | Lebby et al. |
| 6,177,950 B1 | | 1/2001 | Robb |
| 6,208,342 B1 | | 3/2001 | Mugura et al. |
| D441,733 S | | 5/2001 | Do et al. |
| 6,243,080 B1 | * | 6/2001 | Molne .......................... 345/173 |
| 6,297,945 B1 | | 10/2001 | Yamamoto |
| 6,327,482 B1 | | 12/2001 | Miyashita |
| 6,397,078 B1 | | 5/2002 | Kim |
| 6,424,834 B1 | | 7/2002 | Reitmaa et al. |
| 6,430,405 B1 | | 8/2002 | Jambhekar et al. |

(Continued)

FOREIGN PATENT DOCUMENTS

| | | |
|---|---|---|
| EP | 0802659 | 10/1997 |
| JP | 10065780 | 3/1998 |
| JP | 2001210962 | 8/2001 |
| JP | 2000308033 | 11/2001 |
| JP | 2001308992 | 11/2001 |
| WO | 0 651 544 | 5/1995 |
| WO | WO 00/69151 | 11/2000 |
| WO | WO01/60030 | 8/2001 |
| WO | WO01/72014 | 9/2001 |
| WO | WO 01/75580 | 10/2001 |
| WO | 1265423 A1 | 12/2002 |

OTHER PUBLICATIONS

Kyocera Smartphone Series phone brochure (2 pages), 4/01.

Nokia 9000 Owner's Manual, Chapter 2, Communication Interface, pp 2–7 through 2–15 and Chapter 13, Phone Interface, pp 13–1 through 13–16.

(Continued)

*Primary Examiner*—Sonny Trinh
(74) *Attorney, Agent, or Firm*—John J. King

(57) ABSTRACT

A foldable wireless communication device functioning as a cellular telephone and a personal digital assistant is disclosed. The wireless communication device comprises a first body portion; a touch screen element positioned on the first body portion; a second body portion coupled to the first body portion, the second body portion being movable between a first position and a second position; and a display positioned on the second body portion.

16 Claims, 20 Drawing Sheets

U.S. PATENT DOCUMENTS

| | | | |
|---|---|---|---|
| 6,434,403 B1 * | 8/2002 | Ausems et al. | 455/556.2 |
| 6,487,396 B1 | 11/2002 | Sassi | |
| 6,542,721 B2 * | 4/2003 | Boesen | 455/90 |
| 6,571,086 B1 * | 5/2003 | Uusimaki | 379/368 |
| 6,577,496 B1 | 6/2003 | Gioscia et al. | |
| 6,580,488 B2 * | 6/2003 | Kim | 349/143 |
| 6,658,271 B1 * | 12/2003 | Wu | 455/573 |
| 2001/0002926 A1 | 6/2001 | Moon | |
| 2001/0030850 A1 | 10/2001 | Ditzik | |
| 2001/0034229 A1 | 10/2001 | Park et al. | |
| 2001/0045988 A1 | 11/2001 | Cone | |
| 2001/0049296 A1 | 12/2001 | Lee et al. | |
| 2001/0055983 A1 | 12/2001 | Ohmura et al. | |
| 2002/0018558 A1 | 2/2002 | Hirayama et al. | |
| 2002/0063518 A1 | 5/2002 | Okamoto | |
| 2002/0067408 A1 | 6/2002 | Adair et al. | |
| 2002/0107045 A1 | 8/2002 | Gancarcik et al. | |
| 2002/0151283 A1 * | 10/2002 | Pallakoff | 455/90 |
| 2002/0173344 A1 | 11/2002 | Cupps et al. | |
| 2003/0064685 A1 | 4/2003 | Kim | |
| 2003/0078077 A1 | 4/2003 | Kokubo | |

OTHER PUBLICATIONS

U.S. Appl. No. 10/307,834, entitled "A Cellular Telephone Having a Touch Screen User Interface," filed Dec. 2, 2002.

U.S. Appl. No. 10/307,601, entitled "User Interface for a Cellular Telephone Functioning as a Personal Digital Assistant," filed Dec. 2, 2002.

U.S. Appl. No. 10/499,211, entitled "Foldable Cellular Telephone," filed May 30, 2003.

* cited by examiner

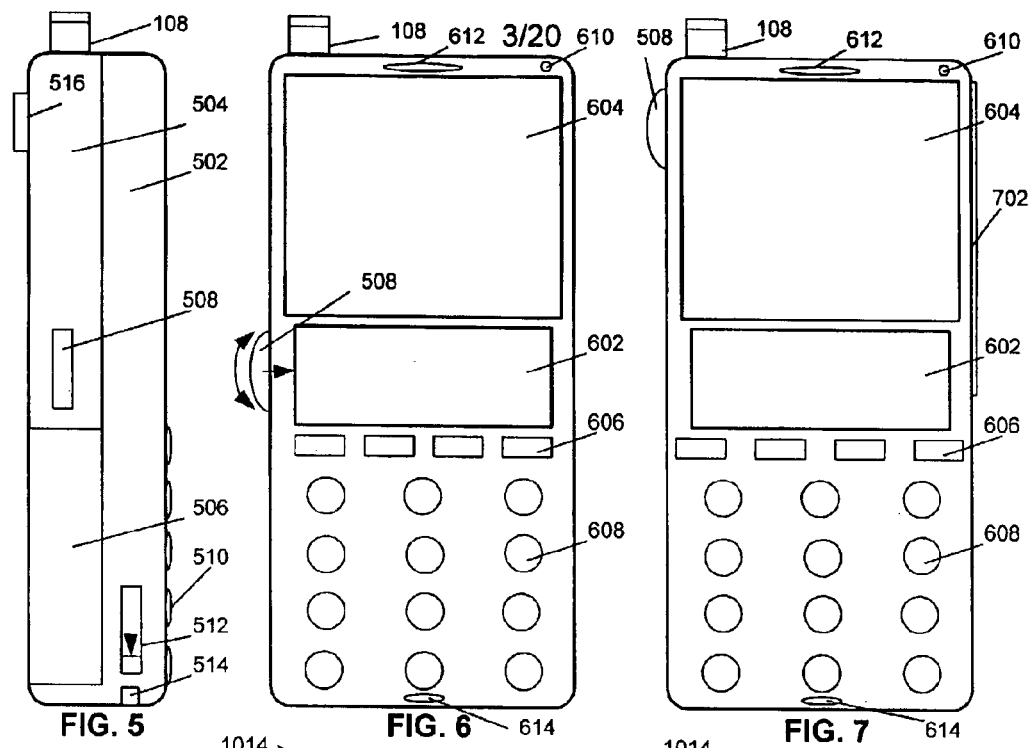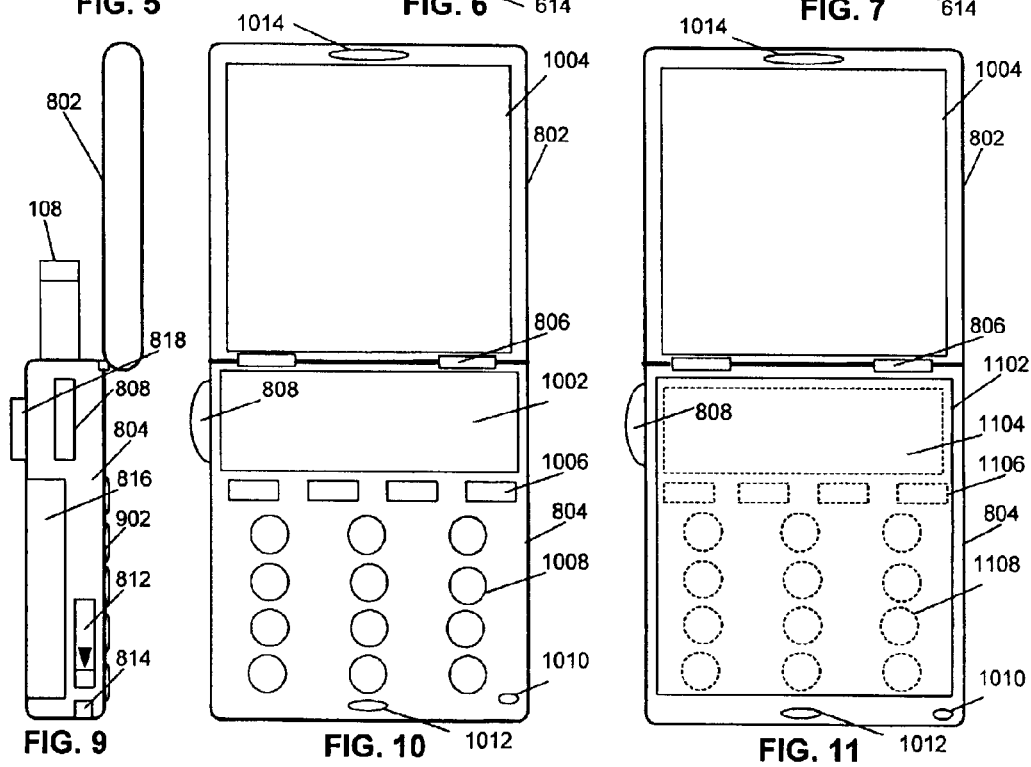

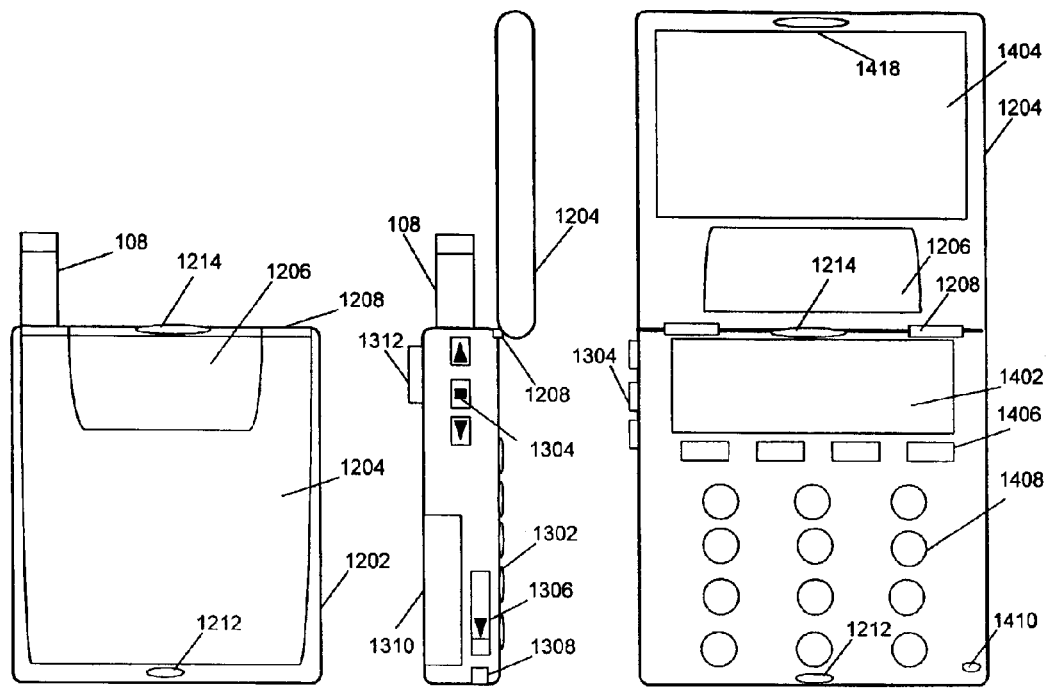
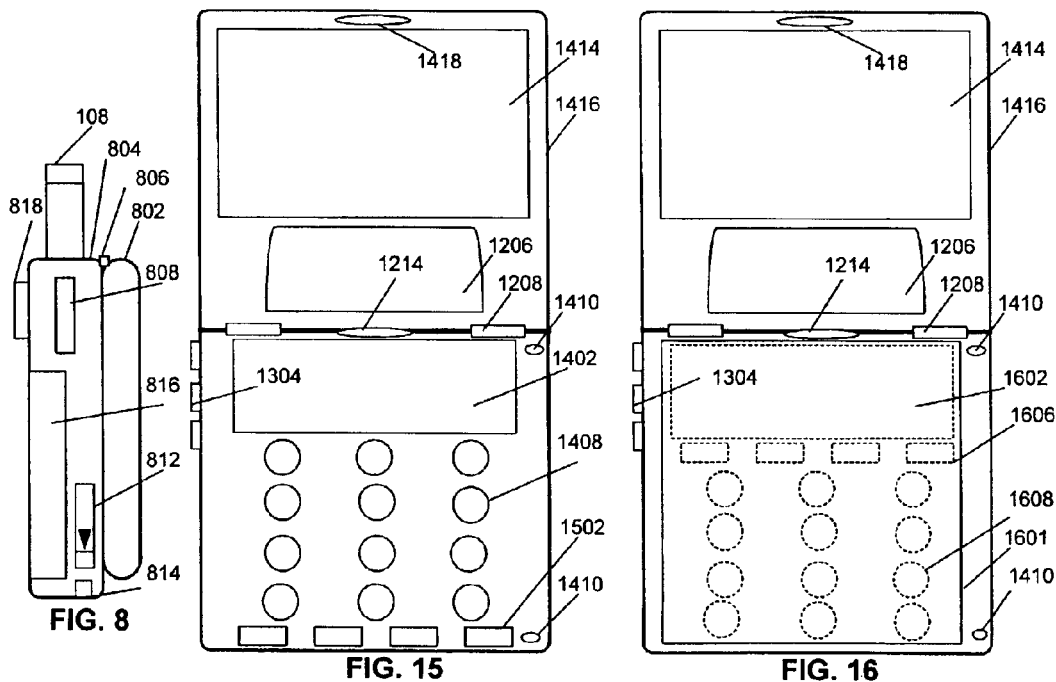

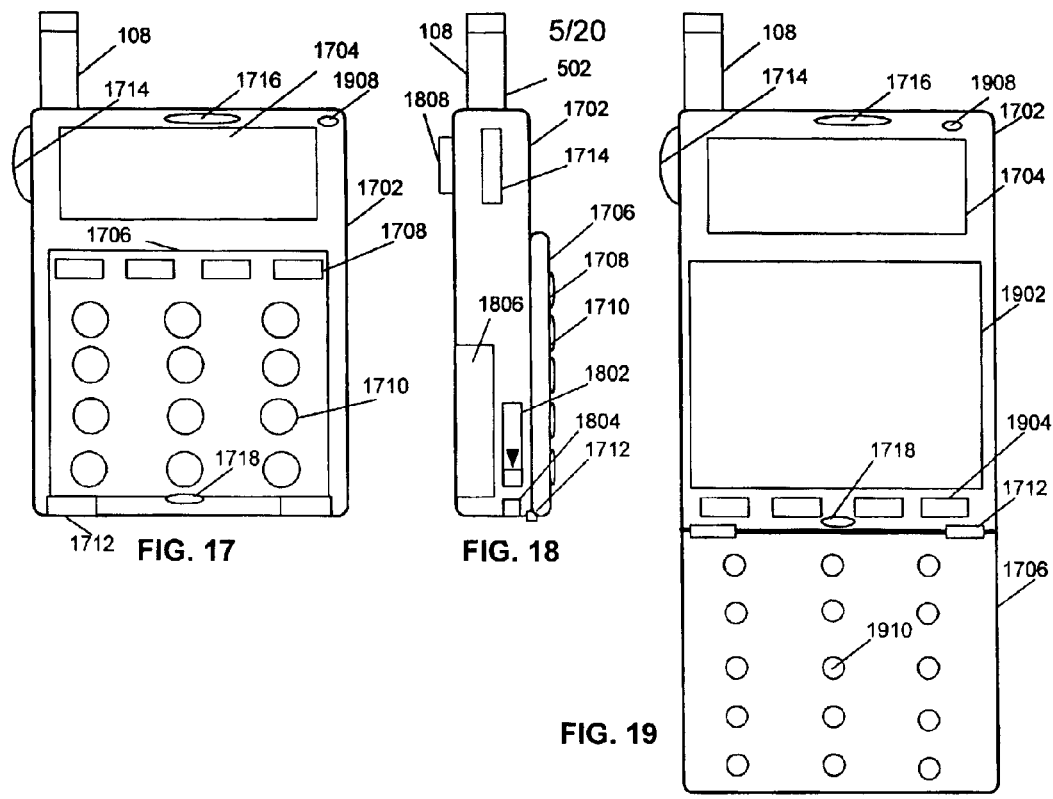
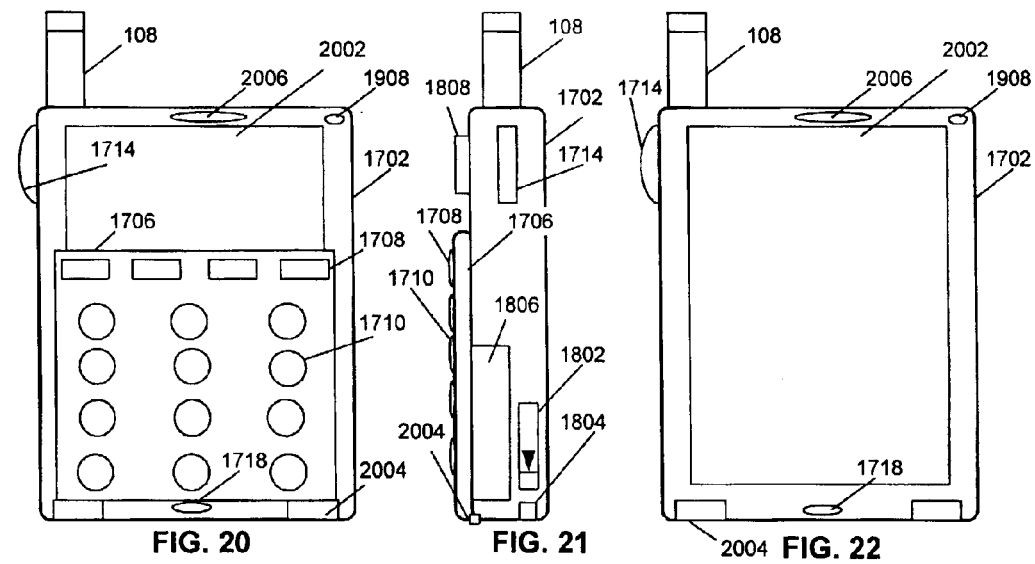
FIG. 17  FIG. 18  FIG. 19
FIG. 20  FIG. 21  FIG. 22

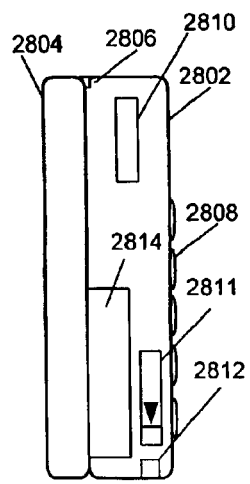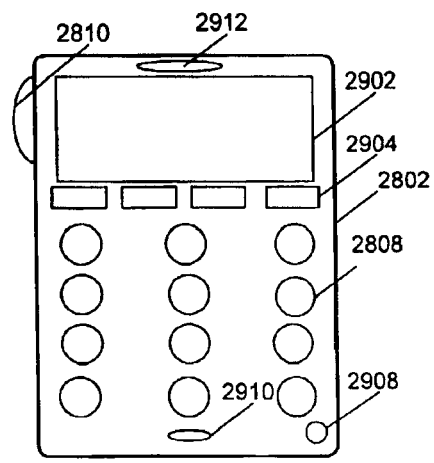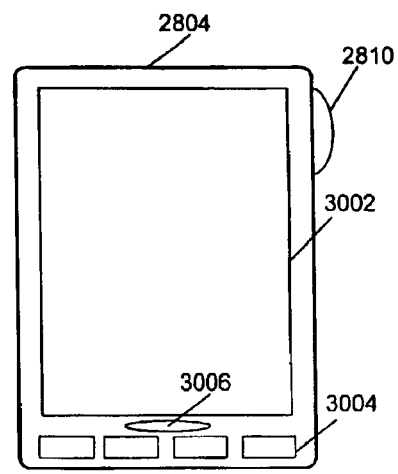
FIG. 28  FIG. 29  FIG. 30
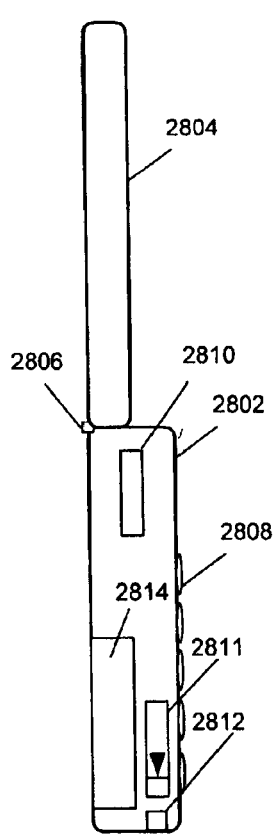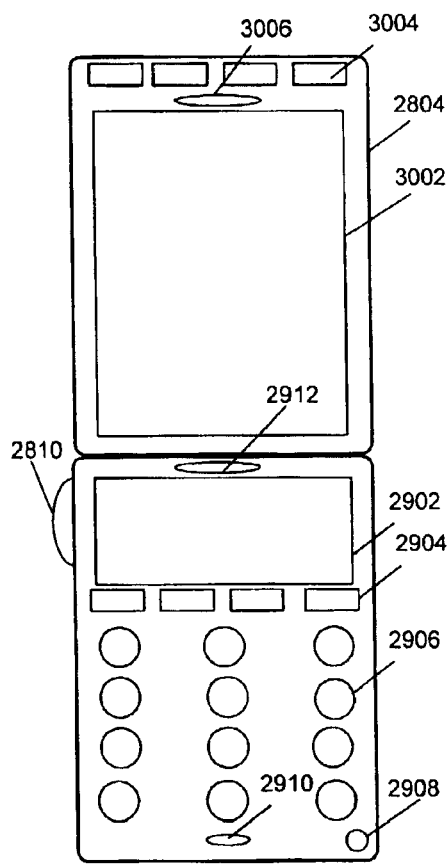
FIG. 31  FIG. 32

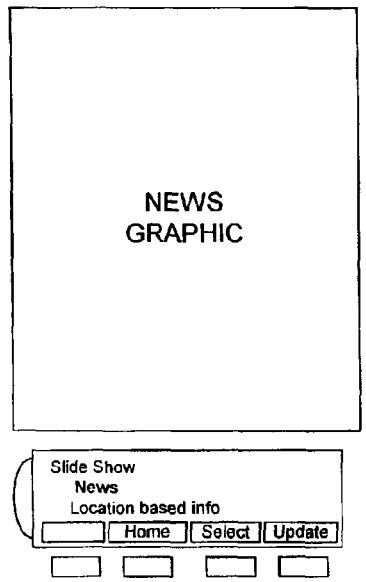
FIG. 38-A
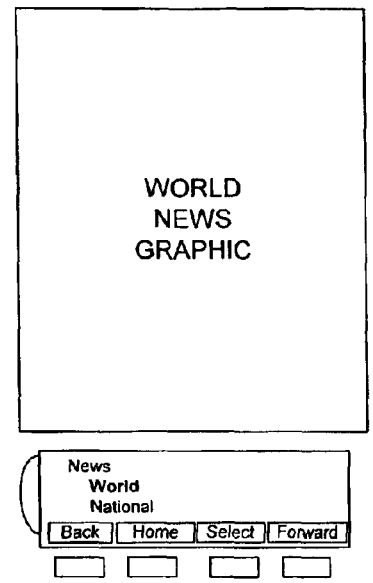
FIG. 38-B
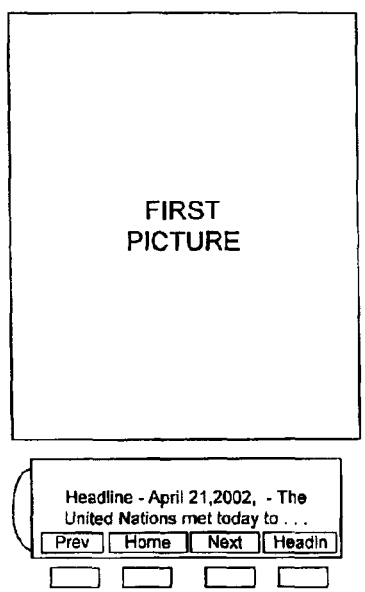
FIG. 38-C
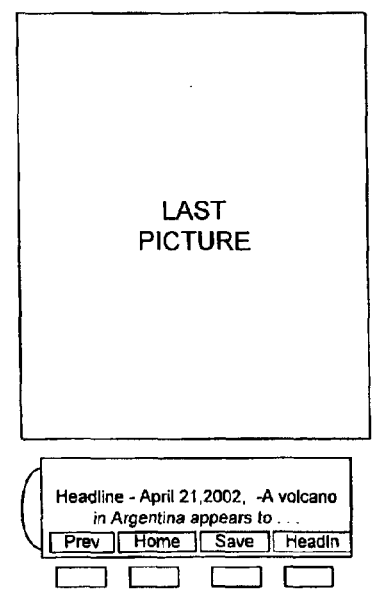
FIG. 38-D

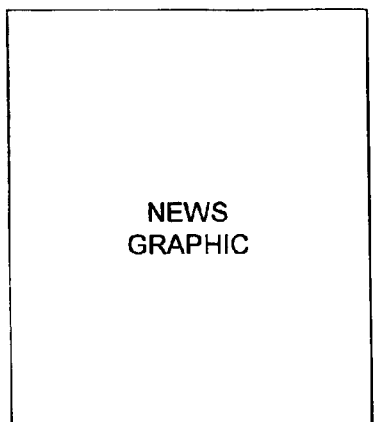
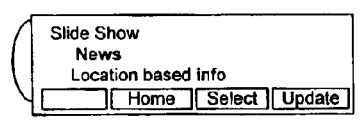
FIG. 39-A
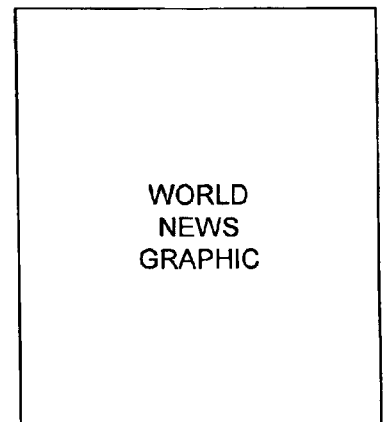
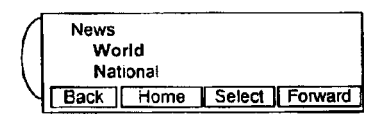
FIG. 39-B
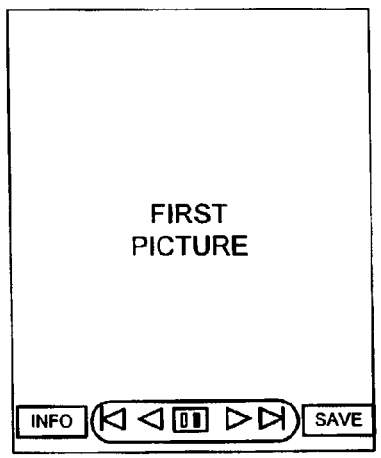
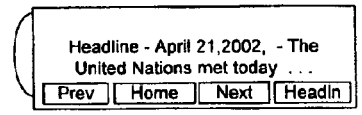
FIG. 39-C
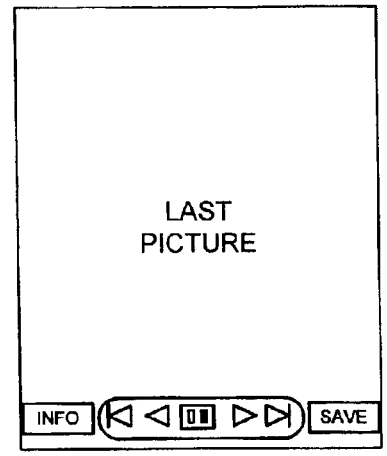
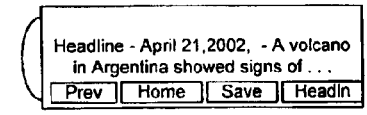
FIG. 39-D

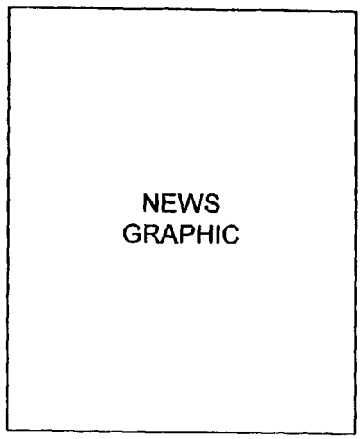
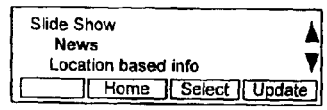
FIG. 40-A
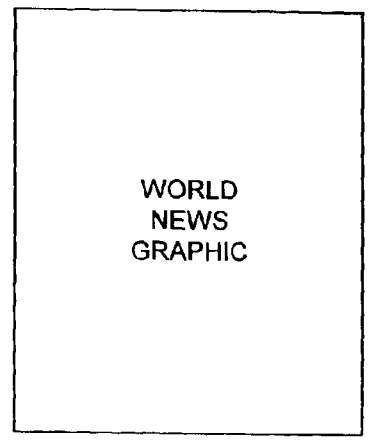
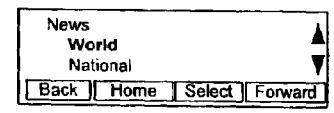
FIG. 40-B
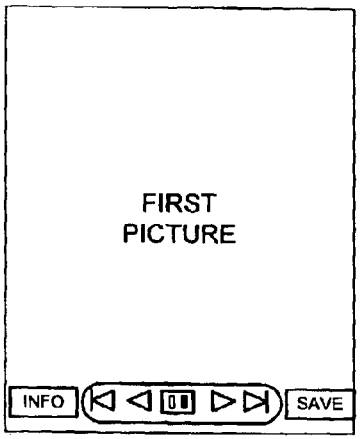
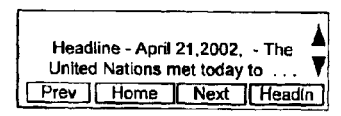
FIG. 40-C
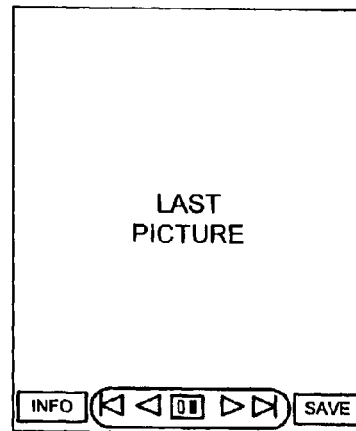
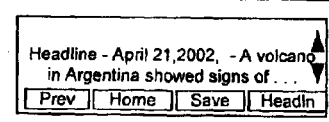
FIG. 40-D

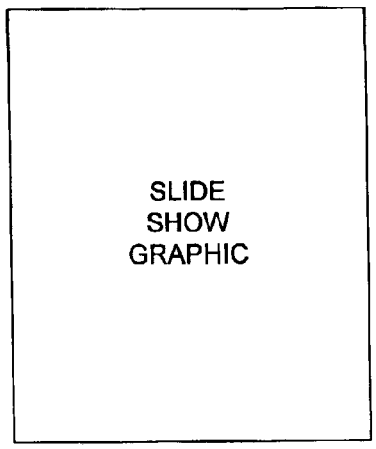
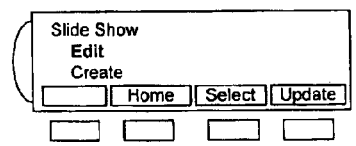
FIG. 41-A
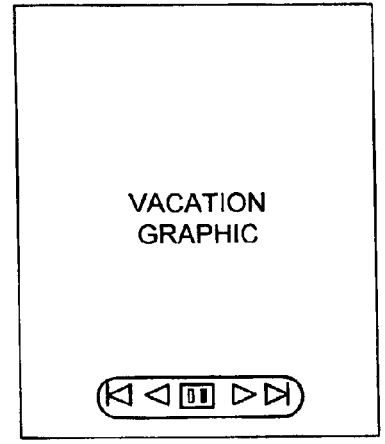
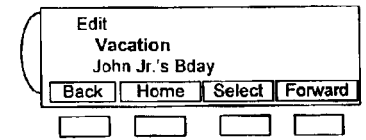
FIG. 41-B
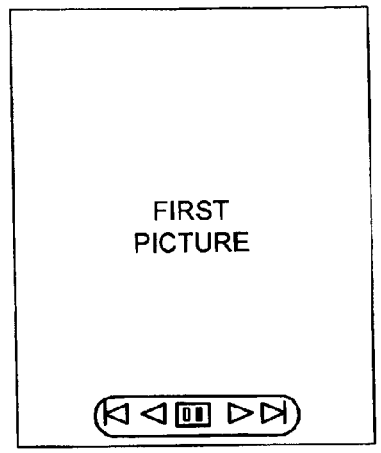
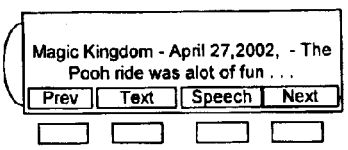
FIG. 41-C
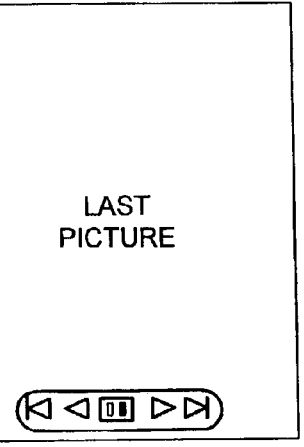
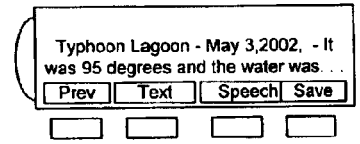
FIG. 41-D

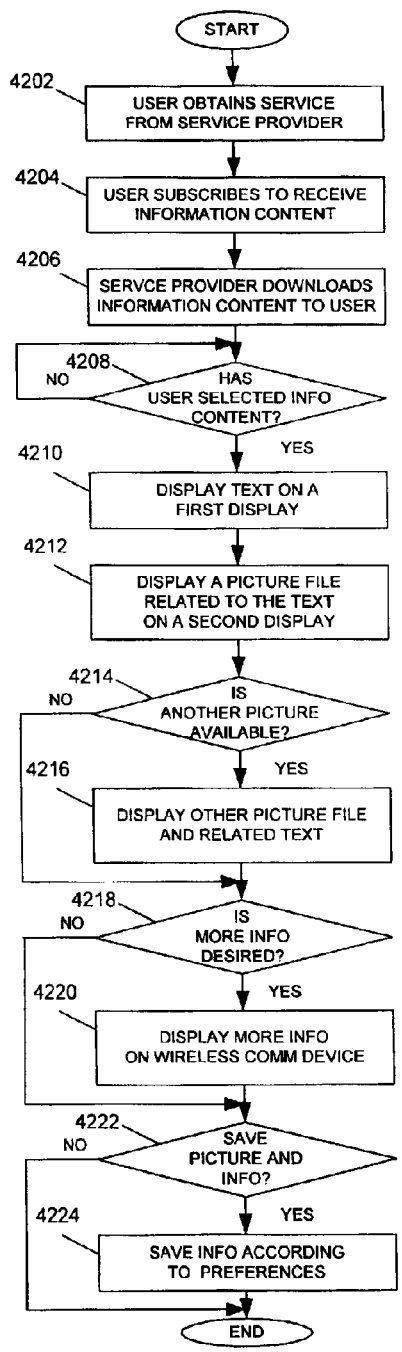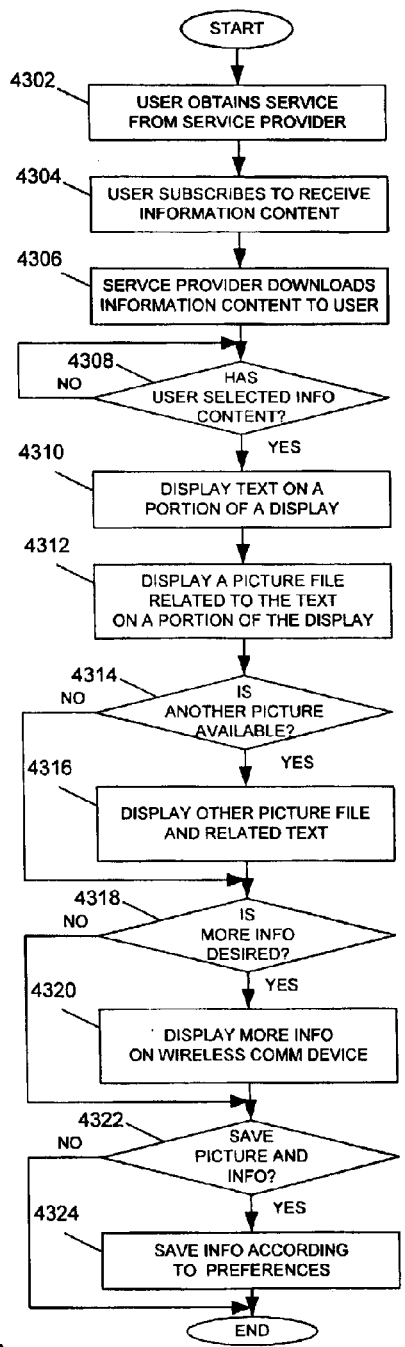
FIG. 42
FIG. 43

FOLDABLE WIRELESS COMMUNICATION DEVICE FUNCTIONING AS A CELLULAR TELEPHONE AND A PERSONAL DIGITAL ASSISTANT

RELATED APPLICATIONS

The present invention relates to U.S. application Ser. No. 10/307,834, entitled A CELLULAR TELEPHONE HAVING A TOUCH SCREEN USER INTERFACE, and U.S. application Ser. No. 10/307,601, entitled A USER INTERFACE FOR A CELLULAR TELEPHONE FUNCTIONING AS A PERSONAL DIGITAL ASSISTANT, all filed on Dec. 2, 2002 by the same inventors as the present invention and assigned to the Assignee of the present invention.

CLAIMS FOR PRIORITY

Applicants claim priority of U.S. application Ser. No. 60/384,942, entitled METHOD AND APPARATUS OF DISPLAYING INFORMATION ON A WIRELESS COMMUNICATION DEVICE filed on May 31, 2002, and U.S. application Ser. No. 60/389,814, entitled METHOD AND APPARATUE OF DISPLAYING INFORMATION ON A WIRELESS COMMUNICATION DEVICE filed Jun. 19, 2002, both filed by the same inventors as the present invention and assigned to the Assignee of the present invention, the entire applications of which are incorporated by reference.

FIELD OF THE INVENTION

This disclosure relates generally to wireless communication devices, networks, and services, and more particularly to devices, networks, and methods for displaying information on a wireless communication device.

BACKGROUND OF THE INVENTION

Since the discovery of two-way radios, wireless communications has continuously evolved. Over the last two decades, cellular telephones have become increasingly popular and widely used. As the number of users has increased, the rates for airtime have decreased, further expanding the market of users of cellular telephones. However, the increasing number of users of cellular telephones and the lower rates for services have put financial pressure on wireless service providers. In particular, wireless service providers have had to invest in new networks to increase capacity to handle the additional users, while their profit margins have decreased due to competition leading to reduced rates for service.

In order to address capacity and profit margin issues caused by the increased number of subscribers and the reduced margins on services, wireless service providers have adopted digital cellular telephone networks, such as TDMA, CDMA or GSM networks. Such networks not only have enabled more users on a network, but also have enabled additional features, such as email, short messaging service (SMS), enhanced messaging service (EMS), or multimedia messaging service (MMS) messaging, which are well known in the art of cellular communications. More importantly, GPRS, EGDE, CDMA2000 and its derivatives, or other advanced networks have enabled a considerable increase in data or information content provided to wireless communication devices. GPRS is generally a feature of current digital cellular telephone networks that enables an "always-on" service for wireless communication devices. That is, GPRS enables the display of data or information on a cellular telephone instantaneously and continuously in a fashion which is similar to a computer user on the Internet using a T-1 line, which is well known in the art.

Similarly, in order to increase the sale of cellular telephones, manufacturers and wireless service providers have been promoting new cellular telephones with color displays, also called color screens. Such new cellular telephones are intended to increase sales both through the sale of phones to new subscribers or replacement phones for existing subscribers. The color displays on the new cellular telephones enable the transfer of new types of data, such as pictures or photographs.

However, while such phones are being offered, no user interfaces, networks or services are providing features which can both increase the use of the wireless communication device or increase revenues for service providers. That is, while such improvements as color displays on cellular telephones and new networks such as GPRS or CDMA 2000 and its derivatives exist, conventional cellular telephones and services provided by wireless service providers are significantly deficient in providing new content which is adapted to be displayed by a color display on a cellular telephone or transmitted on an "always-on" network, such as a GPRS network. Similarly, the user interfaces of such conventional cellular telephones are not adapted to display the new content which could be provided to color displays on cellular telephones. More importantly, many parties who enable the provision of content and services to users of wireless communication devices are missing significant revenue opportunities. That is, because of the lack of features for wireless communication devices and services provided by wireless service providers, wireless service providers, content providers, Internet service providers, and others are missing opportunities for generating additional revenue for their content or services.

As more people wish to carry a wireless communication device such as cellular telephone with them, there is a greater demand for smaller devices. However, at the same time, there is an increased demand for more content to be provided to users to increase revenue to service providers. With smaller devices, it is becoming increasingly difficult to provide more content to the devices. One significant barrier is the size of the display on current wireless communication devices. Further, the user interfaces currently provided are inadequate for enabling the display of content on a wireless communication device.

Accordingly, there is a need for a wireless communication device for displaying a greater amount of content, and methods for displaying a greater amount of content to a wireless communication device.

Accordingly, there is a need for an improved wireless communication device for enabling the display of a greater amount of content and features provided on wireless communication networks.

There is a further need for improved wireless communication networks for providing a greater amount of content to a user of a wireless communication device.

There is a further need for improved wireless communication service features for providing a greater amount of content to user of a wireless communication device.

Finally, there is a need for methods of generating revenue for advanced wireless communication networks which provide service to new wireless communication devices, such as cellular telephones having a plurality of displays.

Accordingly, there is a need for devices, networks and methods for providing a greater amount of content to a wireless communication device.

BRIEF DESCRIPTION OF THE DRAWINGS

FIG. 5 is a side view of a wireless communication device according to the present invention;

FIG. 6 is a top plan view of the wireless communication device of FIG. 5 according to the present invention;

FIG. 7 is a top plan view of an alternate embodiment of the wireless communication device of FIG. 5 according to the present invention;

FIG. 8 is a side view of a wireless communication device according to the present invention;

FIG. 9 is a side view of the wireless communication device of FIG. 8 when opened according to the present invention;

FIG. 10 is a top plan view of the wireless communication device of FIG. 9 according to the present invention;

FIG. 11 is a top plan view of an alternate embodiment of the wireless communication device of FIG. 9 according to the present invention;

FIG. 12 is a top plan view of a wireless communication device when closed according to the present invention;

FIG. 13 is a side view of the wireless communication device of FIG. 12 when open according to the present invention;

FIG. 14 is a top plan view of the wireless communication device of FIG. 12 when opened according to the present invention;

FIG. 15 is a top plan view of the wireless communication device of FIG. 12 when opened according to an alternate embodiment of the present invention;

FIG. 16 is a top plan view of the wireless communication device of FIG. 12 when opened according to an alternate embodiment of the present invention;

FIG. 17 is a top plan view of a wireless communication device according to the present invention;

FIG. 18 is a side view of the wireless communication device of FIG. 17 when closed according to the present invention;

FIG. 19 is a side view of the wireless communication device of FIG. 17 when opened according to the present invention;

FIG. 20 is a top plan view of the wireless communication device of FIG. 17 according to the present invention;

FIG. 21 is a side view of a wireless communication device of FIG. 20 when opened fully according to the present invention;

FIG. 22 is a top plan view of the wireless communication device of FIG. 20 when fully open according to the present invention;

FIG. 28 is side view of the wireless communication device according to an alternate embodiment of the present invention;

FIG. 29 is to plan view of one side of the wireless communication device of FIG. 28 when closed according to the present invention;

FIG. 30 is top plan view of the other side of the wireless communication device of FIG. 28 when closed according to the present invention;

FIG. 31 is side view of the wireless communication device of FIG. 28 when opened according to the present invention;

FIG. 32 is top plan view of the wireless communication device of FIG. 28 when opened according to the present invention;

FIG. 38 is a series of displays showing a user interface according to the present invention;

FIG. 39 is a series of displays showing a user interface according to an alternate embodiment of the present invention;

FIG. 40 is a series of displays showing a user interface according to an alternate embodiment according to the present invention;

FIG. 41 is a series of displays showing a user interface for editing a slide show according to an alternate embodiment according to the present invention;

FIG. 42 is a flowchart showing a method of providing a wireless communication device having a plurality of displays according to the present invention;

FIG. 43 is a flowchart showing a method of providing a wireless communication device having a plurality of displays according to the present invention;

DETAILED DESCRIPTION

Figure 1:
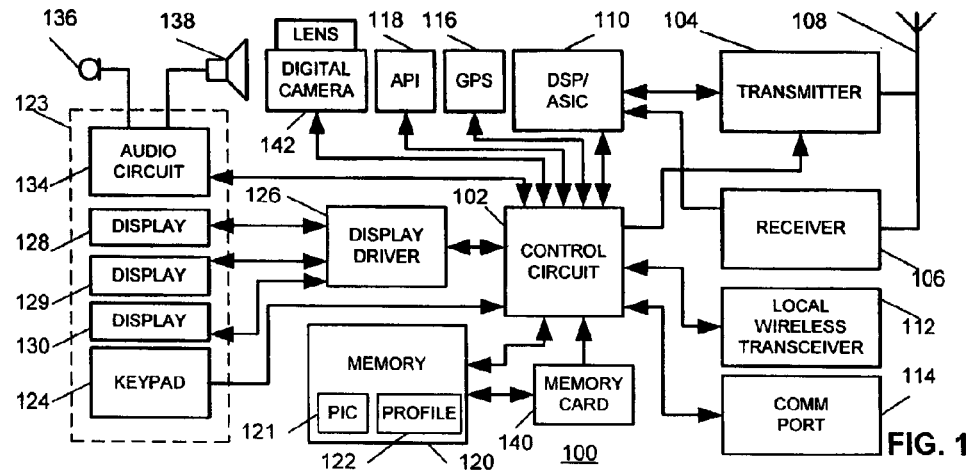
FIG. 1 is a block diagram of an alternate embodiment of a wireless communication device according to the present invention

The present disclosure provides numerous unique and novel features, user interfaces, services, communication networks, wireless communication devices, and revenue-generating business methods related to providing information and/or picture file content to wireless communication devices. Unlike conventional wireless communication devices, such as cellular telephones or pagers, which rely primarily on the transmission of voice or simple data respectively, the methods and devices of the present disclosure enable the transmission of advanced content to novel wireless communication devices by way of novel wireless communication networks. In particular, the present disclosure describes wireless communication devices, preferably having a plurality of displays including one or more color displays, which display information content, such as picture files, text, or advanced picture content, from a wireless service provider. Advanced picture content refers to the display of one or more picture files using display functions, such as screensavers, slide shows, location-based information, streaming videos, the display of information related to picture files, or both. Picture files means any type of icon, graphic, digital image or photograph, design, background screen, etc., stored in any type of standard or proprietary format, such as JPEG, GIFF, TIFF, etc. Similarly, the present disclosure describes networks for enabling the transmission of advanced picture content from a wireless communication network to a wireless communication device. More importantly, the devices of the present disclosure preferably include a plurality of displays, or a single display having a plurality of display areas, for separately displaying pictures and other information. The other information could be text information related to the displayed picture, or functions of the wireless communication device. Such text information could include advertisements, coupons, or other promotional information from a vendor. Further, the present disclosure provides new and unique methods for generating revenue by providing advanced picture content to a wireless communication device.

One significant advantage of the present inventions is that a user view a picture file as well as other information or functions of the wireless communication device without having to close the picture file or have a portion of the picture file obscured when cursoring through text or other information associated with the picture file. Further, a user of the wireless communication device will become familiar with the location of particular content, such as user interface icons, text or picture files. Also, the methods and devices of the present invention can significantly reduce power consumed by a display of a wireless communication device by placing one or more displays of a plurality of displays of a device in a low power mode when only one is in use. While a number of specific embodiments are shown, it is contemplated that a particular feature(s) of one specific embodiment could be incorporated on another embodiment.

Turning now to FIG. 1, a block diagram of the wireless communication device 100 is shown. In particular, a control circuit 102 is coupled to a transmitter 104 and to a receiver 106. The transmitter and receiver are coupled to an antenna 108 for transmitting and receiving RF communication signals, as is well known in the art. The wireless communication device 100 preferably includes a digital signal processor (DSP)/application-specific integrated circuit (ASIC) 110. The DSP/ASIC 110 is coupled to the transmitter 104 and the receiver 106, and is adapted to enable communication of digital signals between the control circuit 102 and the transmitter 104 and the receiver 106. The wireless communication device 100 also preferably includes a local wireless transceiver 112. The local wireless transceiver 112 could be any low-power local wireless transceiver which would enable short range communication to another device. The local wireless transceiver 112 could communicate on any wireless protocol, such as infrared, Bluetooth, IEEE 802.11, or some other local wireless communication protocol. A communication port 114 is also preferably coupled to the control circuit 102 to enable a wired communication link to another device, such as another wireless communication device 100 or a different device such as a laptop or desktop computer. The communication port 114 could enable communication between the devices by way of any wired communication protocol, such as RS-232, or some proprietary protocol.

A global positioning system (GPS) Unit 116 is also preferably coupled to the control circuit 102 to provide location information to the control circuit. That is, the GPS unit 114 can provide the location information related to the location of the wireless communication device 100, as is well known in the art. Although a GPS unit is shown, any other circuit or software for providing location information of the wireless communication device 100 could be employed according to the present disclosure. For example, triangulation using base stations in a wireless communication network, as is well known in the art, could be used to provide less accurate location information related to the wireless communication device 100. An application program interface (API) 118 is also coupled to the control circuit 102 to provide an application interface, as is well known in the art.

A memory 120 comprising a picture memory 121 and a profile 122 is also preferably coupled to the control circuit. As will become apparent in reference to the remaining figures, various data, such as picture files, information data, and other information could be stored in the picture memory 121. Similarly, user data could be stored in the profile portion 122. Memory 120 could be incorporated in a single memory device, or a plurality of memory devices, as is well known in the art. In particular, a combination of memory devices, such as a read-only memory (ROM), a random-access memory (RAM), or an EEPROM could be employed, as is well known in the art, depending upon the nature of the information stored in the memory. Although the memory is shown partitioned into a picture memory 121 and a profile portion 122, such a partitioning is merely shown by way of example, and the memory could be partitioned in any way.

Finally, a user interface 123 is coupled to the control circuit 102 to enable a user of the wireless communication device 100 to transmit and receive information with a device by way of a communication network. In particular, a keypad 123 is coupled to the control circuit 102 to enable entry of information which can be provided by way of a display driver 126 to a display 128, a display 129, or a display 130 of the user interface 123. The keypad could be a numeric keypad having alphanumeric-entry capability, or could be a full QWERTY keypad for easier entry of alphanumeric characters. As will be described in more detail in reference to other figures, the displays could be positioned at different locations on the wireless communication device. The displays could all be color displays, black and white displays, or a combination of color and black and white. The displays preferably comprise full color liquid crystal displays (LCDs). The displays could be used for displaying information including pictures, text, icons, functional icons, etc. stored in the wireless communication device, downloaded from a wireless communication network, or viewed or captured by the digital camera 142. The displays could also have a predetermined function, such as displaying text, picture files or a user interface and its associated functional icons. Finally, the displays could represent portions of a single display dedicated to one or more particular functions.

The user interfaces further comprises audio circuitry 134, which includes a microphone 136 and a speaker 138. The control circuit 102 and audio circuit 134 also preferably enable voice-activated communication, including voice recognition communication as well as speakerphone capability. Such voice recognition circuitry and/or software could be employed in the wireless communication device or at the service provider. Finally, a memory card 125, such as a compact flash card or multimedia memory card, would enable the storage of one or more picture files or other information taken by a digital camera 142 having a lens on the camera or stored in the memory 120, or provided to control circuit 102 for display or downloaded to the memory 120 for later display. Although an exemplary wireless communication device 100 is shown, the features and functions of the wireless communication device 100 could be employed in other functional arrangements, or by other functional blocks which are well known in the art. The wireless communication device 100 as shown in FIG. 1 is merely an exemplary device showing the fundamental features of a wireless communication device employing the features and functions described in the present disclosure.

Figure 2:
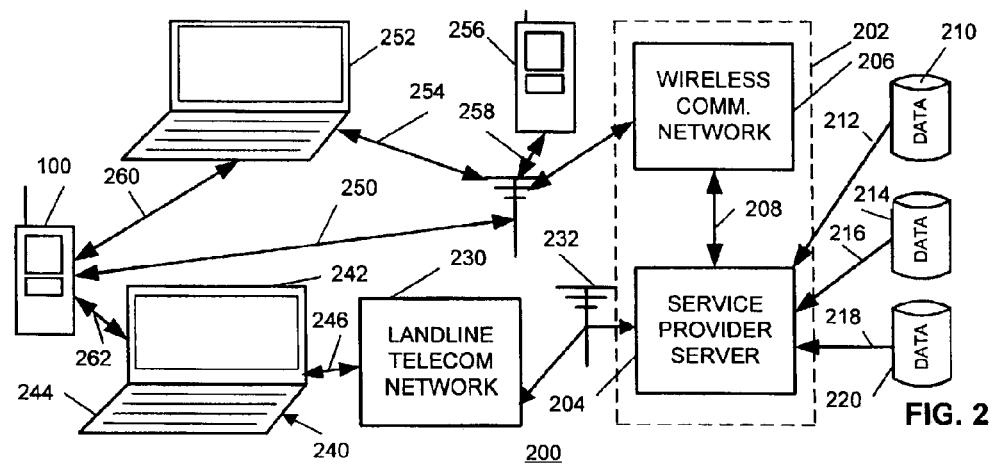
FIG. 2 is a block diagram of a wireless communication network according to the present invention.

Turning now to FIG. 2, a block diagram shows a wireless communication network according to the present disclosure. In particular, the wireless communication network 200 comprises a wireless service provider 202. Wireless service provider 202 preferably comprises a service provider server 204, which is coupled to a wireless communication network 206 by way of a communication link 208. The service provider server 204 could be operated by the same entity and on the same premises as the wireless communication network 206, or could be separate from the wireless communication network 206. For example, the wireless service provider 202 could be any cellular telephone service provider, personal communications services (PCS) service provider, or some other wireless service provider, which provides both the wireless communication network 206 having the base stations and telecommunication equipment (which are well known in the art to enable the transmission of RF communication signals on a wireless communication network), as well as the service provider server 204 having the necessary servers to enable the features and services of the present disclosure. Alternatively, the service provider servers could be provided by a separate entity from a wireless communication network 206 according to the present disclosure.

In addition to communicating with the landline communication network 230, which could enable communication with a communication device 240, such as a laptop or desktop computer having a display 242 and a keyboard 244 by way of a communication link 246, the wireless service provider 202 communicates with wireless communication devices, such as the wireless communication device 100, by way of a communication link 250. For purposes of this disclosure, a wireless communication device is any portable radio frequency (RF) communication device enabling bi-directional communication, such as a cellular telephone, pager, or combined cellular telephone/personal digital assistant. Because such devices are easily transportable and accessible by a user in any situation, a user can frequently and conveniently benefit from the advanced picture content or other information. In the category of wireless communication devices, such devices could be separated into wireless data communication devices, such as pagers, wireless voice communication devices, such as cellular telephones, or wireless voice/data communication devices, which are the most common and include, for example, digital cellular telephones, PCS telephones or other wireless telephony devices having data capabilities, such as email, SMS, EMS or MMS. In contrast, portable or laptop computers that can be adapted to enable wireless communication or PDAs that merely receive wireless data, would not be considered wireless communication devices, but rather portable computers.

Further, the wireless service provider 202 could communicate with such as a portable computer 252, having a display and keypad, by way of a communication link 254, and the wireless communication device 100 could communicate by a communication link 260. Communication link 260 could be, for example, a wired connection, such as a standard RS-232 connection, or some other wired protocol, or a wireless connection, such as a local area network connection or a wide area network connection. The local area network connection could be, for example, a Bluetooth connection, an IEEE 802.11 connection, an infrared connection, or some other low-power, wireless local connection. Similarly, the wireless communication device 100 can communicate with a landline networked computer by way of a communication link 262. The communication link 262 could also be such a wired or wireless connection as communication link 260. Alternatively, the landline networked computer 240 could communicate with the wireless communication device 100 by way of the communication link 246 to the land line telecom network 230 and the wireless communication network 204. Finally, a second wireless communication device 256, similar or identical to wireless communication device 100, could communicate with any other device in the wireless communication network 200, including the wireless communication device 100, by way of a wireless communication link 258, or any other similar communication link shown with respect to wireless communication device 100. As will become apparent in reference to the remaining figures, the elements of the wireless communication network 200 can be used to implement many of the features, services, user interfaces, and other aspects of the present disclosure.

Figure 3:
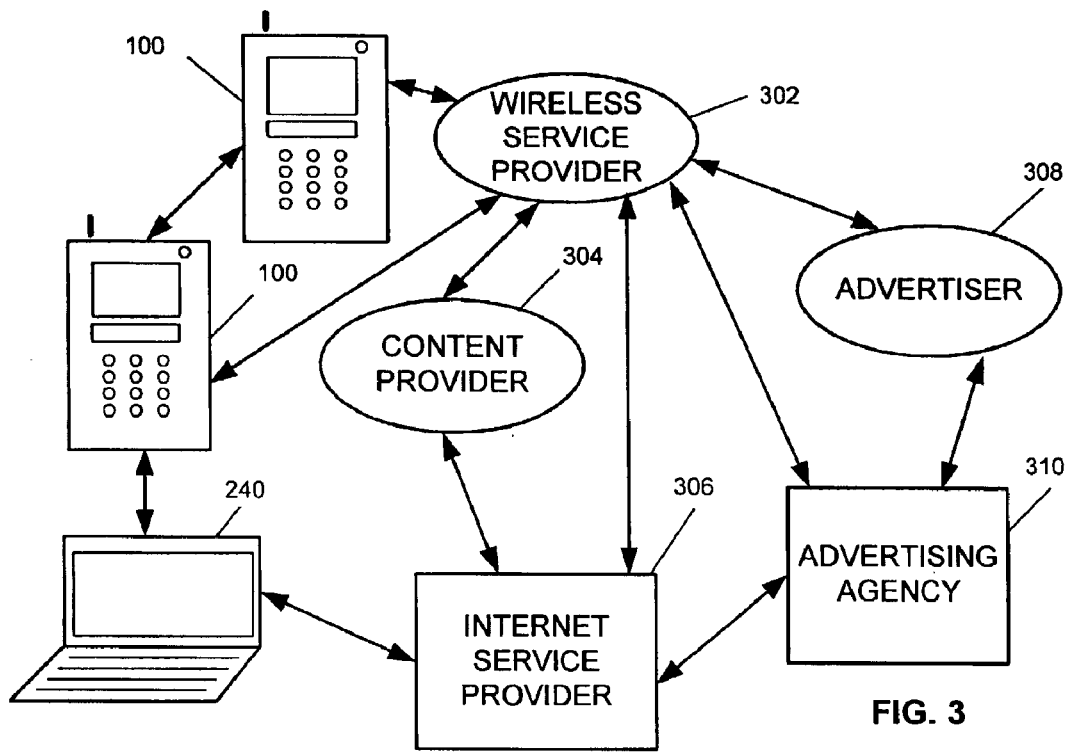
FIG. 3 is a block diagram of an alternate embodiment of a wireless communication network according to an alternate embodiment of the present invention.

Turning now to FIG. 3, a wireless communication network having a number of elements which implement features or provide services according an alternate embodiment of the present invention is shown. In particular, a wireless service provider 302 communicates with a content provider 304 to receive content. The content provider 304 could provide any type of content, such as news, weather, sports, points of interest, location-based content, or any other variety of content which the wireless service provider 602 could provide to its subscribers by way of the wireless communication device 100. The content provider 304 could also communicate with an internet service provider (ISP) 306 to provide content to a device 100 by way of the communication device 240. Alternatively, the wireless service provider 302 could communicate directly with an Internet service provider to provide information to the wireless communication device 100. Finally, the wireless service provider 302 could communicate directly with an advertiser 308, or indirectly with the advertiser 308 by way of an advertising agency 310. The advertiser 308 or advertising agency 310 could provide advertisements to the wireless service provider 302, which could in turn be provided to the wireless communication device 100 or the communication device 244, according to methods, features, or services of the present disclosure.

Figure 4:
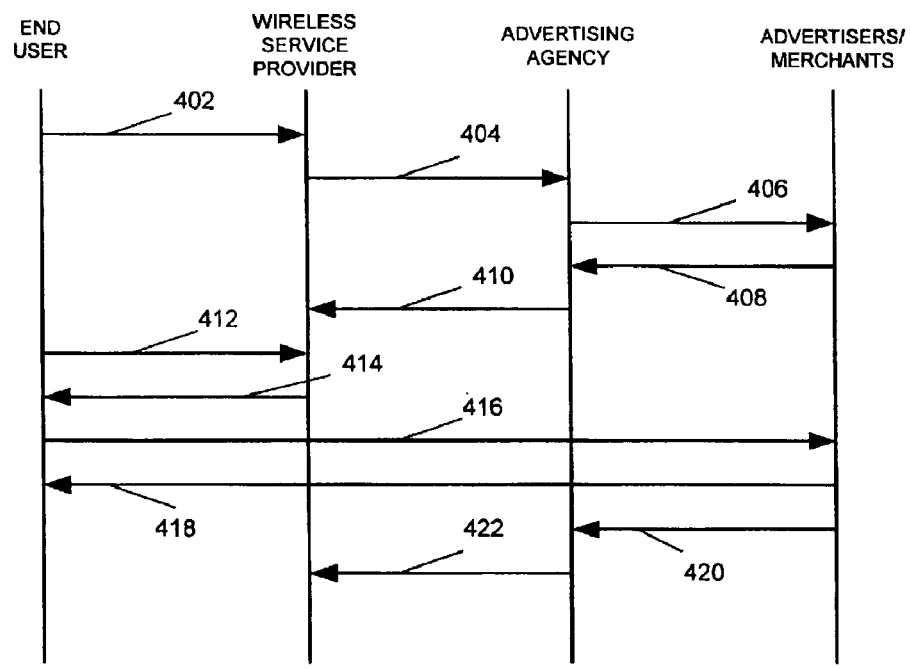
FIG. 4 is a timing diagram showing the relationship between entities in the wireless communication network of FIG. 3.

Turning now to FIG. 4, a timing diagram shows an example of a business method for enabling the communication of content, such as advanced picture content to a wireless communication device 100. In particular, an end user of the wireless communication device enters into a contract or other arrangement for the provision of services with the wireless service provider 302 at a step 402. The wireless service provider also enters into a contract or other provisioning arrangement with an advertising agency 310 at a step 404. The advertising agency also enters into an agreement with an advertiser 308 at a step 406. The advertiser 308 preferably provides advertisement to the advertising agency 310 at a step 408. The advertising agency in turn provides the advertisements to the wireless service provider 302 at a step 410.

The user of the wireless communication device 100 then communicates with the wireless service provider 302 at a step 412. For example, the user of the wireless communication device could request certain services which require either content from the content provider 304 or an internet service provider 306, or agree to receive advertisements from either advertiser 308 or advertising agency 310 as compensation for also receiving information or advanced picture content at a step 412. Accordingly, the wireless service provider provides content and/or advertisement to the wireless communication device 100 at a step 414.

As will be described in more detail in reference to the remaining figures, the user can then access additional information or purchase a product from the advertiser 306 at a step 416. In response to the request from the end user, the advertiser 308 provider information and/or products to the end user at a step 418. The advertiser then provides the advertising agency with a percentage of revenue generated at a step 420, and the advertising agency 310 provides a percentage of revenue generated to the wireless service provider at a step 422. Although the various steps are shown in a particular order, the order of the various steps could vary as should be apparent. Similarly, steps could be omitted or equivalent transactions as to those shown could be employed according to the present disclosure.

Turning now to FIGS. 5–7, one embodiment of a wireless communication device according to the present disclosure is shown. In particular, a front housing 502 and a rear housing 504 generally contain the wireless communication device 100. A battery 506 is coupled to the housings to power the wireless communication device. A user interface actuator 508, which will be described in more detail in reference to other figures, and a keypad 510 are also shown. This user interface actuator is shown as a multifunction dial, such a Jog Dial™ actuator from Sony Corporation commonly provided on their cellular telephones. However, other multifunction actuators disclosed in this application or known in the art could be employed according to the present invention. It will be understood that components or features of the various embodiments can be interchanged as desired. An eject key 512 enables the ejection of a memory device, such as memory device 125, from a user accessible slot 415. Finally, a lens 516 is shown on the back of the wireless communication device.

As can be seen in the top plan view of FIG. 6, a first display 602 is shown above the keypad. The first display 602 could be used for displaying text or other information. A second display 604, which could be a color liquid crystal display (LCD), is also shown. Keypad 510 comprises a user interface keypad 606 having a plurality of user interface actuator keys, and a conventional numeric keypad 608. The user interface actuator keys could be hard keys (i.e. having predetermined functions which may be printed on the key) or soft keys (i.e. where the function of the key is displayed above the key in the display and changes).

The user interface comprising the user interface actuator 508 and keypad 606 can be used in conjunction with each other, as well an optional touchscreen feature of the displays 602 and 604. As will be described in more detail in reference to other figures, the user interface comprising the user interface actuator 508 and keypad 606 can be used to control the content of screen 602 and 604, either directly or indirectly. For example, by enabling the selection of features or functions in the display 602, the user may affect the content displayed in display 604. Also shown on the housing of the wireless communication device is a power key 610, a speaker 612, and a microphone 614. Also shown in FIG. 7 is a stylus 702 for enabling a touch-screen display, as will be described in reference to remaining figures. Finally, the embodiment of FIG. 7 shows the user interface actuator 508 positioned near the top of the phone to be used to control display 604, alternatively to directly control the content of display 604.

One particular application of the wireless communication devices having a plurality of displays according to the present invention is the downloading of content having one or more picture files from a wireless communication network, and separately displaying the picture file on one display, and information related to the picture file on another display. Alternatively, the wireless communication devices of the present invention could be used as a digital camera, where one display could be used as a view finder or for displaying a picture that had been taken, while the other display could be used to (i) control the functions of the camera, or (ii) enter text related to the picture to store with the picture, or include in a MMS message text to be displayed as a part of a screen saver or slide show. Although two displays are shown, the wireless communication devices and methods could also employ a single display which is partitioned by function, as will be shown in later embodiments. For example, a single display could have a first predetermined portion to display text or icons associated with various functions of the device, while a second portion could be used for the display of pictures. Such an alternate embodiment would enjoy the benefits of the present invention, such as power saving, where a portion of the display could be deactivated or placed in low power mode to reduce battery consumption.

Turning now to FIGS. 8–11, an alternate embodiment of the wireless communication device of the present disclosure is shown. The wireless communication device of FIG. 8 generally comprises an upper portion 802 which is coupled to a lower portion 804 by a hinge 806. A user interface actuator 808 enables the selection of content on the wireless communication device. The user interface actuator 808 could be any type of multifunction switch, such as a plurality of buttons enabling cursoring up and down and selection, a dial type switch, which is rotatable and pressable, or the like enabling a user to rotate through a menu and select an entry of the menu by pressing the dial. The wireless communication device also preferably includes an eject key 812 to eject a memory device from a slot 814 and a battery 816. Finally, a lens 818 for an embedded digital camera is shown.

As shown in FIG. 9, when the wireless communication device is opened, and the upper portion is moved to a second position, a keypad 902 is exposed. Also shown in FIG. 10, a first display 1002 and a second display 10004. The embodiment of FIGS. 8–10 preferably includes a user interface keypad 1006 having a plurality of user interface actuator keys, and a conventional numerice keypad 1008. Alternatively, the first display 1002 and/or the second display could be a touch screen display. Finally, the wireless communication device also preferably includes a power key 1010, a microphone 1012, and a speaker 1014.

Finally, as shown in FIG. 11, an alternate embodiment of the wireless communication device includes a touch-screen display 1102 on a lower housing, and a stylus 1104 for actuating the touch-screen display. As can be seen in FIG. 11, the use of a display substantially covering the upper housing 1004, and the touch-screen display 1102 covering a substantial portion of the lower housing 804. An area for displaying text 1106, and user interface actuator keypad 1108 and conventional alphanumeric keypad 1110 are shown in dashed lines to indicate that they are currently present, but could be replaced, depending upon the selection by a user. Although the upper portion 802 and the lower portion 804 of the wireless communication device in this and other embodiments of "foldable" or "clamshell" phones described herein are shown in parallel planes when open, the portions could be moved to an angle with respect to one another to enable a more ergodynamic arrangement when used for voice telephony.

Turning now to FIGS. 12–16, an alternate embodiment of a wireless communication device of the present disclosure is shown. In particular, the wireless communication device comprises a lower housing 1202 coupled to an upper housing 1204 having a lens 1206 by a hinge 1208. Alternatively, the area occupied by the lens could be left open, wherein the open area exposes the display, and optionally surrounds a raised display. Finally, a speaker 1214, and a microphone 1212 are included As shown in this and other embodiments of foldable phones, the microphone and speaker are preferably exposed when in the closed position to enable audio content to be received from or provided to a user, depending upon the application. The speaker, such a speaker used in a device enabling handsfree communication, is therefore capable of a providing audio related to content shown in the display through the lens 1206 to a user who may be holding the device at arms length.

As shown in FIG. 13, when the upper housing 1204 is moved to a second position, a keypad 1302 is exposed. Also visible in the side view of FIG. 13 is a user interface actuator 1304 comprising up and down keys for cursoring and a "select" key in the center. The wireless communication device also preferably includes an eject key 1306 to eject a memory device from a slot 1308, and a battery 1310.

As shown in FIG. 14, a first display 1402 on the lower housing and a second display 1404 on the upper housing is visible. A user interface keypad 1406 having a plurality of user interface actuator keys and a conventional numeric keypad 1408 are provided on the lower housing. The user interface actuator keypad 1406 is available, alone or in conjunction with user interface actuator 1304 to control the display 1402 and/or display 1404 when the wireless communication device is opened. Also shown on the housing of the wireless communication device is a power key 1410. A second speaker 1418 adapted to provide audio directly to the ear could be provided to enable a conventional voice call.

Finally, as shown in FIG. 15, the user interface actuator keypad 1406 could be positioned at the bottom of the lower housing. The positioning of the user interface actuator keypad 1406 would preferably be accessible when the device is closed to enable, alone or in combination with user interface actuator 1304, the selection of information on the first display 1402 through the transparent lens 1206. Finally, as shown in FIG. 16, a touch screen display 1601 having an area for displaying text 1602, and user interface actuator keypad 1606 and conventional alphanumeric keypad 1608 are shown in dashed lines to indicate that they are currently present, but could be replaced, depending upon the selection by a user.

Turning now to the embodiments of FIGS. 17–26, alternate embodiments of a wireless communication device a rubber keypad/touch-screen design according to the present disclosure are shown. In particular, a main housing portion 1702 comprises a first display 1704. A keypad portion 1706 preferably has a user interface keypad 1708 and a conventional numeric keypad 1710. The keys are preferably rubberized, flexible keys which are movably attached to the keypad portion and, when pressed, extend to a touch-screen below (shown in FIG. 19) to actuate the touch-screen. The keypad portion 1706 is coupled to the main housing 1702 by a hinge 1712 and is movable with respect to the main housing. A user interface actuator 1714 positioned on the side of the wireless communication device enables easy thumb operation of the user interface. Finally, a speaker 1716, and a microphone 1718 are positioned on the housing of the wireless communication device.

As shown in FIG. 18, the wireless communication device also preferably includes an eject key 1802 to eject a memory device from a slot 1804 and a battery 1806. Finally, a lens 1808 is positioned on the housing 1702 to enable digital photography. When the keypad portion 1706 is moved to an open position, a second display 1902 is exposed. A user interface keypad 1904 is also optionally disposed below the display 1902, and can be used, alone or in conjunction with user interface actuator 1704 to control display 1904 and/or display 1702. According to one embodiment, user interface actuator 1714 could control the display 1704, while the user interface keypad 1904 could control the display of display 1902. Also shown in FIG. 19 is a power key 1908.

Figure 23:
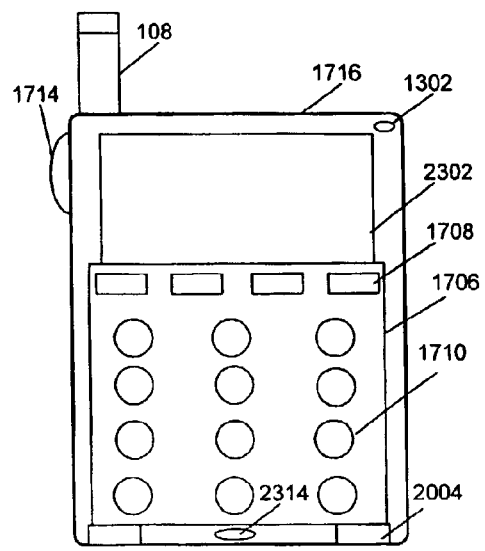
FIG. 23 is a top plan view of the wireless communication device of FIG. 21 when closed according to an alternate of the present invention.
Figure 24:
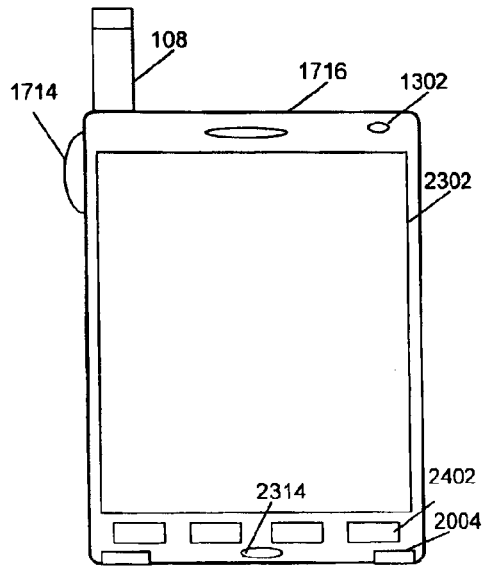
FIG. 24 is a top plan view of the wireless communication device of FIG. 23 when fully opened according to the present invention.

As shown in the embodiment of FIGS. 20–22, the wireless communication device is similar to the embodiment of FIG. 17 except that a single display 2002 is employed. A special hinge 2004 enables movement of the keypad portion from the front of the device to behind the device as shown in FIG. 21. When the keypad element 1706 is moved to a position behind the main housing 1702, the entire display is exposed as shown in FIG. 22. The display is preferably a touch screen display and preferably could function as a PDA or a wireless communication device. As shown in the embodiment of FIGS. 23–24, either user interface keypad 1708 or 2402 is exposed when the keypad is covering the display or behind the device.

Figures 25, 26, 27:
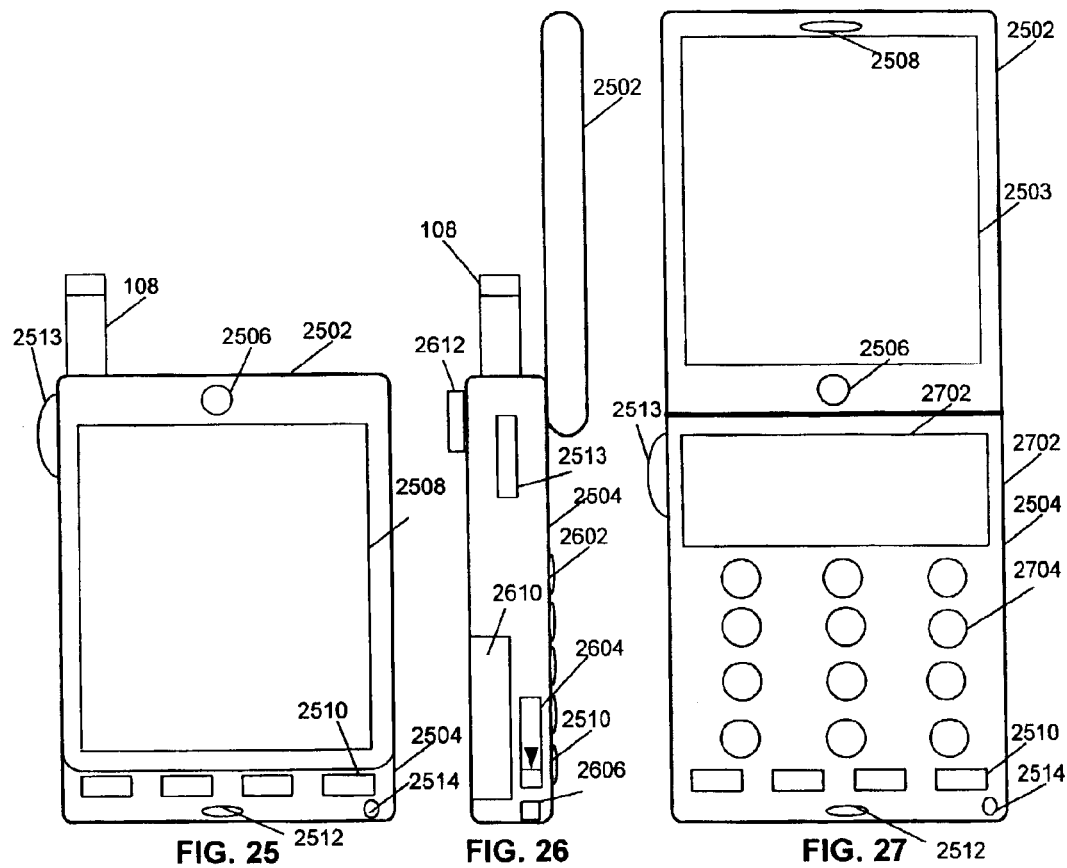
FIG. 25 is a top plan view of the wireless communication device when closed according to an alternate embodiment of the present invention.
FIG. 26 is side view of the wireless communication device of FIG. 25 when fully opened according to the present invention.
FIG. 27 is top plan view of a wireless communication device of FIG. 25 when fully opened according to the present invention.

As shown in the embodiment of FIGS. 25–27, an alternate embodiment of the wireless communication device having a "swivel" display is shown. The wireless communication device has a screen portion 2502, which is coupled to a main body portion 2504 by a hinge element 2506. The screen portion includes a display 2508, which could be a touch screen display, and enable operation of the device as a PDA when closed as shown in FIG. 25. The device preferably includes user interface actuator keys 2510 below the screen and another user interface actuator 2513 on the side of the device. Also shown on the housing of the wireless communication device is a microphone 2512, and a power key 2514. A speaker 2514 could be incorporated in the hinge element 2506 or position adjacent the hinge element at the top of the screen portion.

When the screen portion 2502 is swivled clockwise or counterclockwise with respect to the main body portion as shown in FIG. 25, the device can be opened as shown in FIG. 26. The actuator keys 2510 are preferably recessed to prevent any interference when the screen portion is swivled. Also shown in the side view of FIG. 26 is a kaypad 2602, an eject key 2604 to eject a memory device from a slot 2606, and a battery 2610. A lens 2612 is positioned on the back of the main body 2504. Finally, as shown in FIG. 27, a second display 2702 is visible above a keypad 2704.

Turning now to FIGS. 28–32, an alternate embodiment of a wireless communication device of the present disclosure is shown. According to a unique feature of the present embodiment, both displays are visible both when opened and closed, and can operate separately, and have separate and independent functions when closed, or operate together when opened. However, it will be understood that the hardware and/or software for the two portions of the device could physically reside together in one portion. The wireless communication device comprises a first portion 2802 and a second portion 2804 coupled together by a hinge. The wireless communication device also preferably includes a keypad 2808, a user interface actuator 2810, an eject key 2811 to eject a memory device from a slot 2812, and a battery 2814. As shown in the front view of the device, display 2902 is exposed above a user interface keypad 2904 and a numeric keypad 2906. Also shown on the housing of the wireless communication device is a power key 2908, a microphone 2910, and a speaker 2912. Having an internal antenna, the first portion 2802 enables operation of the device as a cellular telephone. However, as shown in back view of the device in FIG. 30, a second display 3002 and a user interface keypad 3004 enables operation of the device as a PDA. However, when the device is "opened," the display 3002 can be used to display additional content, such as picture files, along with associated information in the first display 2902 as described herein.

Figure 33:
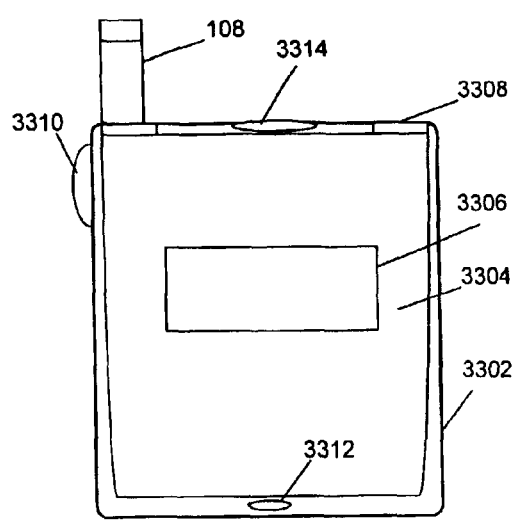
FIG. 33 is front view of the wireless communication device according to an alternate embodiment of the present invention.
Figure 34:
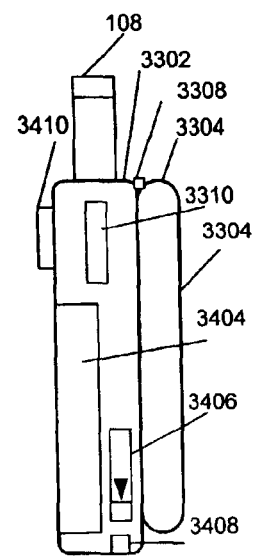
FIG. 34 is side view of the wireless communication device of FIG. 33 when closed according to the present invention.

Turning now to FIGS. 33–36, an alternate embodiment of a wireless communication device of the present disclosure is shown. In particular, the wireless communication device comprises a lower housing 3302 coupled to an upper housing 3304 having a display 3306 by a hinge 3308, as shown in FIG. 33. The display could be a conventional display for displaying caller ID information, or could be a color display which could be used as a viewfinder for a digital camera embodied in or coupled to the wireless communication device. A user interface actuator 3310 is also visible on the side of the wireless communication device. Finally, a microphone 3312 and a speaker 3314 are included. As shown in the side view in FIG. 34 is a battery 3404, an eject key 3406 to eject a memory device from a slot 3408, and a lens 3410.

Figure 35:
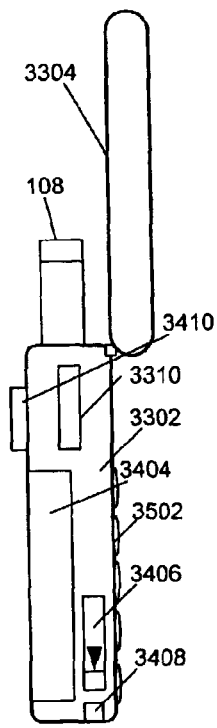
FIG. 35 is side view of the wireless communication device of FIG. 33 when opened according to the present invention.
Figure 36:
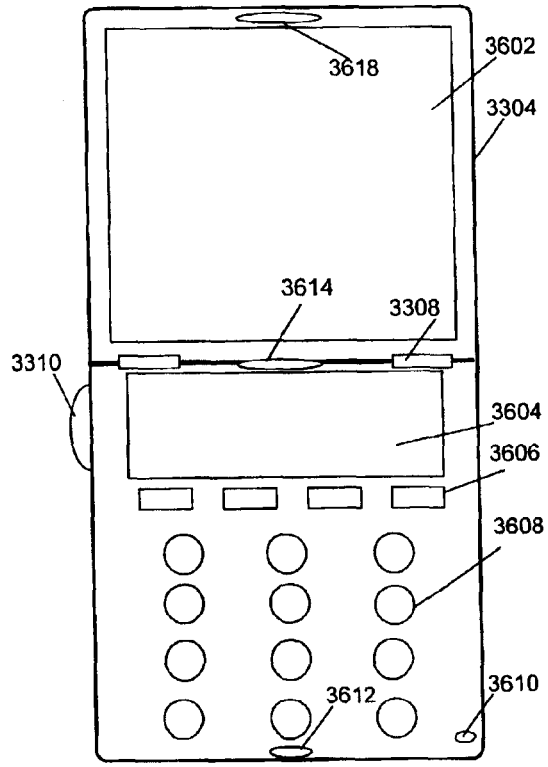
FIG. 36 is top plan view of the wireless communication device of FIG. 33 when opened according to the present invention.

As shown in the side view of FIG. 35, a keypad 3502 is visible. As shown in plan view of FIG. 36, a second display 3602 on the upper housing and a third display 3604 on the lower housing are visible. A user interface keypad 3606 having a plurality of user interface actuator keys and a conventional numeric keypad 3608 are provided on the lower housing. The user interface actuator keypad 3606 is available, alone or in conjunction with user interface actuator 3310 to control the display 3602 when the wireless communication device is opened. Also shown on the housing of the wireless communication device is a power key 3610. A second speaker 3618 adapted to provide audio directly to the ear could be provided to enable a conventional voice call.

Figure 37:
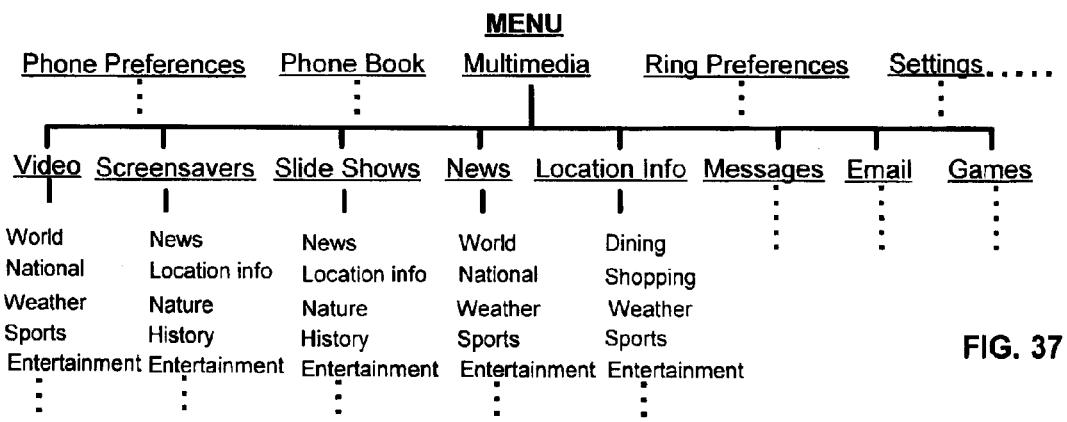
FIG. 37 is a tree diagram showing an example of available content according to the present invention.

Turning now to FIG. 37, a flowchart shows a portion of a user menu for a wireless communication device. In particular, as can be seen in the flowchart, conventional features or options of a wireless communication device can be accessed by a user interface. Further, advanced content, such as multimedia content, can also be accessed. It will be understood that the aspects of the user interface could be incorporated with other features of a wireless communication device, and conversely, that the specific applications and features related to multimedia could be incorporated in any wireless communication device having any other user interface or menu structure. The various options for multimedia, and the categories which can be selected are shown by way of example, and are not intended to be an exclusive or comprehensive list. The multimedia options and associated categories are merely provided by way of example, and for purposes of showing applications of the user interface of the present invention in FIGS. 34–37.

Turning now to FIG. 38, a pair of displays which are simultaneously visible and an associated user interface are shown. The displays and user interface are representative of displays and a user interface which could be incorporated in any of the wireless communication devices described previously. Further, while two separate displays are shown, the features of the user interface described in FIGS. 38–41 could be incorporated in a device having a single display which is partitioned to include two portions, as shown for example in some embodiments of the wireless communication devices described herein. Further, while reference is made to a top display and a bottom display, the display arrangement and user interface could be arranged with the displays as shown switched. Finally, while a multifunction dial or soft keys are shown in some of the embodiments, other user interface actuators could be employed. For example, a rocker switch or a plurality of three keys which would also enable cursoring up or down for selection could be used in place of the dial. Similarly, hard keys with dedicated functions could be used in place of the soft keys shown. Also, the four keys cold be arranged in some other orientation, such as on the sides of a square, or a "joystick" which can be found on phones from Ericsson, Inc. could perform all or some of the function of the four keys as shown.

As shown in FIG. 38-A, a standby screen is displayed in the top display, while a portion of a multimedia menu is displayed in the bottom display. In this example, a user has selected multimedia, and is cursoring through the options including slideshow, news, and e-mail using, for example, a dial on the side of the device as shown and described with respect to the wireless communication devices in the embodiments of FIGS. 5–36. As the user cursors through the options, such as the options shown in FIG. 37, the current option, such as NEWS in this case, is highlighted. Depending on the option highlighted, various options are displayed above the soft keys which could be selected by the user. The softkeys below the bottom display could correspond to the user interface actuator keys shown and described with respect to the wireless communication devices in the embodiments of FIGS. 5–36. For example, the user also has options of returning to a home or main menu, selecting a particular option, or requesting an update of the information. Preferably, a graphic related to the current option is also displayed in the upper display. The graphic would change as the user cursors through the options The options could then be chosen by use of the dial. For example, the user could depress the dial inward to select news.

As shown in FIG. 38-B, when the news option is selected, additional options for news such as world news or national news are shown shown. When the dial is positioned on world news, the world news graphic is preferably displayed in the top display. If the user selects world news, a first headline and information is provided in the bottom display, while an associated picture is displayed in the top display as shown in FIG. 38-C. The dial can be used to cursor through the information provided in the bottom display to view all the information while the actuator keys at the bottom of the bottom display enable the user to select additional headlines. For example, previous or next headlines could be selected. Alternatively, the user could select next picture if additional pictures are available within a particular headline. Finally, when a user advances the next picture to the last picture as shown in FIG. 38-D, the user interface enables the user to select a save option to save the headline and associated pictures.

As shown in the alternate embodiment of FIG. 39, a touch screen for the bottom display could enable a user to select the options, while a touch screen feature in the top display could enable the advancing through content shown in the top display. Similarly, as shown in the alternate embodiment of FIG. 40, touch screens could be employed exclusively on both displays. According to another alternate embodiment, the features of the user interface could be employed on a single display. In particular, a text area at the bottom of the display is accessible by a plurality of soft keys below the display, while a touch-screen actuator enables the cursoring through a plurality of pictures or a video. According to a further alternate embodiment, a dial could be employed to cursor through content on the top display or top portion of a single display.

Turning now to FIG. 41, a specific embodiment of a user interface which is for creating a slide show is shown. In particular, the user can select an edit function of slide show feature, as shown in FIG. 41-A. The user can then select a particular slide show, such as a vacation slide show, as shown in FIG. 41-B. When a picture associated with the slide show is displayed, the user can enter text associated with the picture. For example, the user can select a "Text" option, and enter text using, for example, the keypad on the wireless communication device. Alternatively, the user could select a Speech option and verbally provide the information which will appear as text in the display and stored with the slide show. Speech-to-text (STT) software, which is well known in the art could be employed either in the wireless communication device or the network to convert the user speech to text. Preferably, a user can select a color for text which would be displayed on a device receiving the message if the device is a color display. For example, the user could select, in an option menu or on display, that the text will be in the color red. The text would then appear in red when the text message is composed or displayed when received by another device. Alternatively, the user's speech could be stored as a voice file to be stored with the slide show and replayed when shown or transmitted to another user. Although the example of FIG. 41 uses a screen saver, the methods described be used to create any multimedia, such as a screen saver.

Turning now to FIGS. 42–57, flow charts show methods of displaying information on a wireless communication device as described herein or another suitable wireless communication device, Referring specifically to FIG. 42, a flowchart shows a method of providing a wireless communication device having a plurality of displays according to the present disclosure. A user obtains service from a service provider at a step 4202. The user subscribes to receive information content in a step 4204. The service provider downloads information content to the user at a step 4206. It is then determined whether the user has selected information content on a wireless communication device at a step 4208. If so, text is displayed on a first display at a step 4210. A picture file related to the text, if available, is displayed on a second display at a step 4212. It is then determined whether additional information content is available at a step 4214. If so, another picture file and associated information is displayed at a step 4216. It is then determined whether more information is desired at a step 4218. If so, additional information is displayed at a step 4220. Finally, it is determined whether the information being viewed is desired to be saved at a step 4222. If so, the information is saved according to predetermined preferences at a step 4224. The user can receive more information or save information according to the methods described in U.S. application Ser. No. 60/378,631, entitled METHOD OF AND APPARATUS FOR PROVIDING INFORMATION TO A WIRELESS COMMUNICATION DEVICE filed by the inventors of the present invention and assigned to the same assignee as the present invention, the entire application of which is incorporated by reference.

Turning now to FIG. 43 a flowchart shows a method of providing a wireless communication device having a plurality of displays according to the present disclosure. A user obtains service from a service provider at a step 4302. The user subscribes to receive information content in a step 4304. The service provider downloads information content to the user at a step 4306. It is then determined whether the user has selected information content on a wireless communication device at a step 4308. If so, text is displayed on a first portion of a display at a step 4310. A picture file related to the text, if available, is displayed on a second portion of a display at a step 4312. It is then determined whether additional information content is available at a step 4314. If so, another picture file and associated information is displayed at a step 4316. It is then determined whether more information is desired at a step 4318. If so, additional information is displayed at a step 4320. Finally, it is determined whether the information being viewed is desired to be saved at a step 4322. If so, the information is saved according to predetermined preferences at a step 4324.

Figure 44:
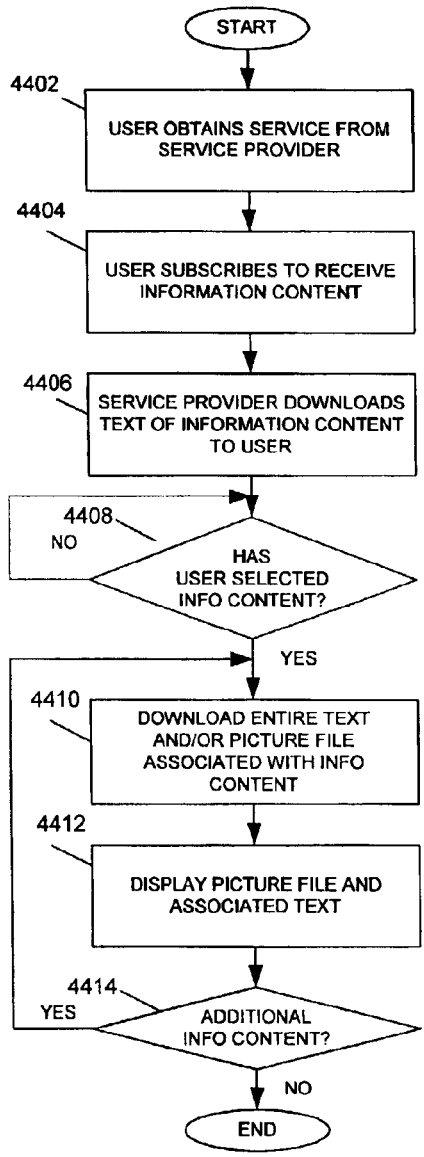
FIG. 44 is a flowchart showing a method of displaying information content according to an alternate embodiment of the present invention.

Turning now to FIG. 44, a flowchart shows a method of displaying information content according to an alternate embodiment of the present disclosure. A user obtains service from a service provider at a step 4402. The user subscribes to receive information content at a step 4404. The service provider downloads text, or a portion of text, of the information content which can be viewed by a user at a step 4406. It is then determined whether the user has selected information content at a step 4408. If so, the service provider downloads the entire text and/or picture file(s) associated with the information content at a step 4410. The information content and associated picture file is then displayed on the wireless communication device at a step 4412. It is then determined whether additional information content is selected at a step 4414. By only downloading a portion of the data, the network will not become overloaded and a user's device will not have memory capacity problems from undesired content.

Figure 45:
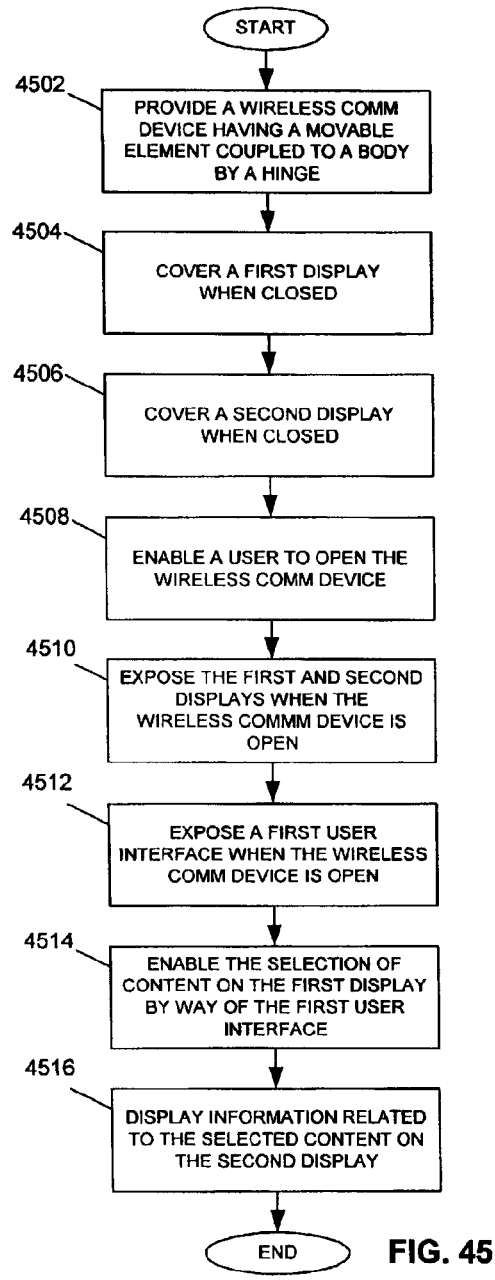
FIG. 45 is a flowchart showing a method of displaying content on a wireless communication device according to an alternate embodiment of the present invention.

Turning now to FIG. 45, a flowchart shows a method of displaying content on a wireless communication device according to an alternate embodiment of the present disclosure. In particular, a wireless communication device is provided having a movable element coupled to a body by a hinge at a step 4502. A first display is covered when the movable element is closed at a step 4504. A second display is also covered when the movable portion is closed at a step 4506. A user is then able to access the first display by the first user interface at a step 4508. The first and second displays are then exposed when the movable element of the wireless communication device is opened in a step 4510. The first user interface remains exposed when the movable element is opened at a step 4512. The selection of content on the first display by way of the first user interface is enabled at a step 4514. Finally, information related to the selection of content is then displayed on a second display in a step 4516.

Figure 46:
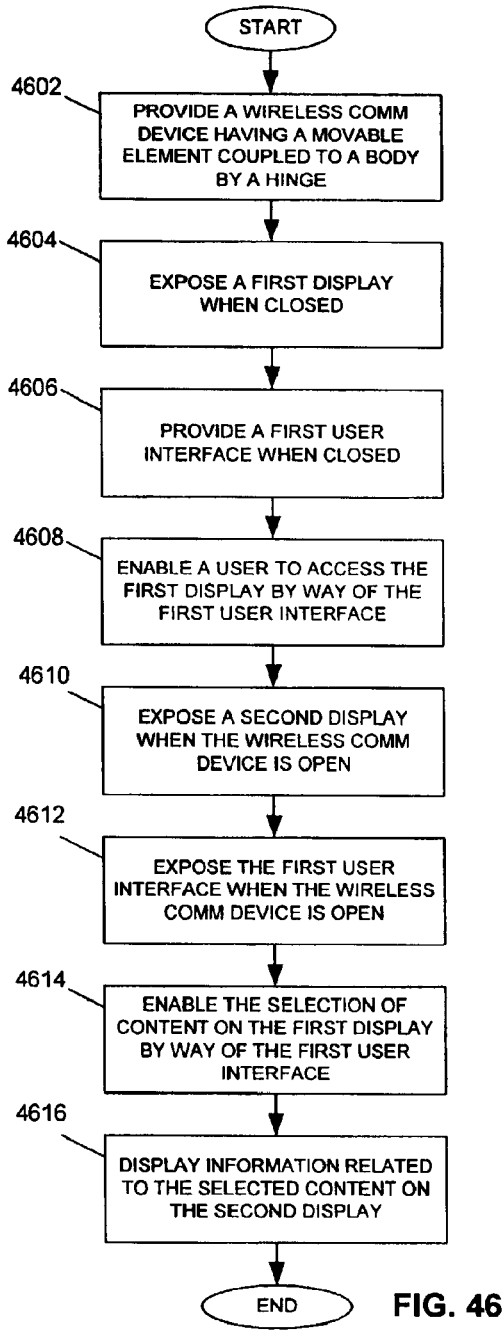
FIG. 46 is a flowchart showing a method of displaying content on a wireless communication device according to an alternate embodiment of the present invention.

Turning now to FIG. 46, a flowchart shows a method of displaying content on a wireless communication device according to an alternate embodiment of the present disclosure. In particular, a wireless communication device is provided having a movable element coupled to a body by a hinge at a step 4602. A first display is exposed when the movable portion is closed at a step 4604. A first user interface is also provided when the movable portion is closed at a step 4606. A user is then able to access the first display by the first user interface at a step 4608. A second display is then exposed when the movable portion of the wireless communication device is opened in a step 4610. The first user interface remains exposed when the movable portion is opened at a step 4612. The selection of content on the first display by way of the first user interface is enabled at a step 4614. Finally, information related to the selection of content is then displayed on a second display in a step 4616.

Figure 47:
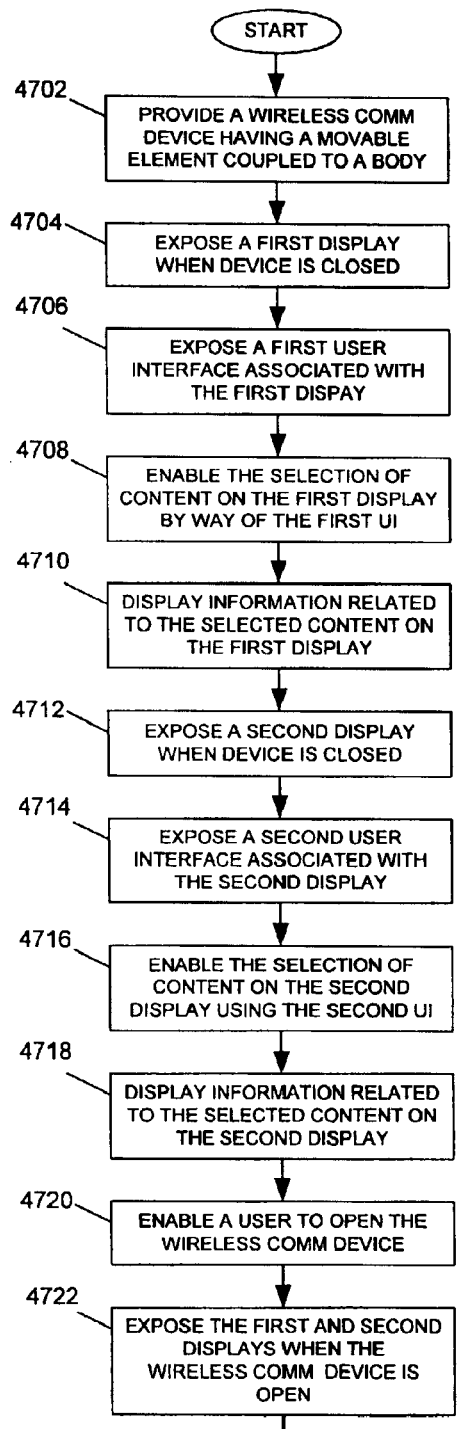
FIG. 47 is a flowchart showing a method of displaying content on a wireless communication device according to an alternate embodiment of the present invention according to the present invention.

Turning now to FIG. 47, a method of displaying information according to an alternate embodiment of the present invention is disclosed. A wireless communication device having a movable element coupled to a body is provided at a step 4702. A first display is exposed when the device is closed at a step 4704. A first user interface associated with the first display is exposed at a step 4706. The user is able to select content on the first display by way of the first user interface at a step 4708. The user can then display information related to the selection of content on the first display at a step 4710. A second display is exposed when the device is closed at a step 4712. A second user interface associated with the second display is exposed at a step 4714. The user is able to select content on the second display by way of the second user interface at a step 4716. The user can then display information related to the selection of content on the second display at a step 4718. The user can open the device at a step 4720, exposing the first and second displays at a step 4722.

Figure 48:
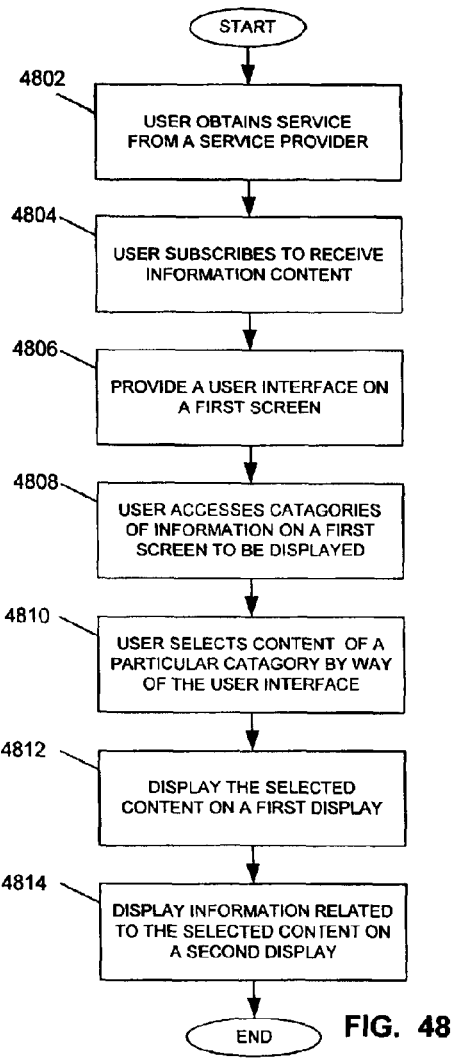
FIG. 48 is a flowchart showing a method of providing a display having multifunction capability according to an alternate embodiment of the present invention.

Turning now to FIG. 48, a flowchart shows a method of providing a display having multifunction capability according to an alternate embodiment of the present disclosure. A user obtains service from a service provider at a step 4802. The user subscribes to receive information content in a step 4804. A user interface is provided on a first screen at a step 4806. A user accesses on the first screen categories of information available to be displayed at a step 4808. The user then selects a content category by way of the user interface on the first display at a step 4810. Information related to the content is then displayed on the first display at a step 4812. Finally, content related to the information displayed on the first display is preferably displayed on a second display at a step 4814. Accordingly, the first display can function both as a user interface to access content, and a display to display information.

Figure 49:
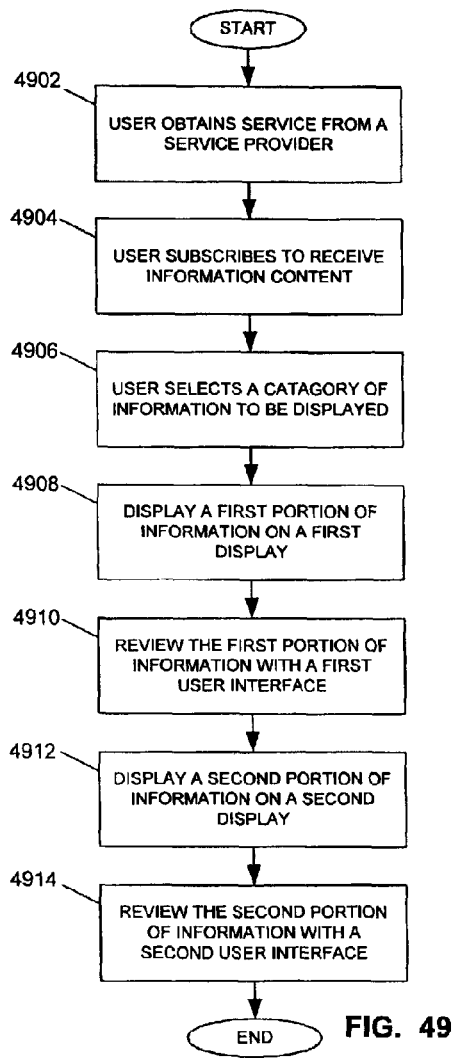
FIG. 49 is a flowchart showing a method of providing separate user interfaces for display according an alternate embodiment of the present invention.

Turning now to FIG. 49, a flowchart shows a method of providing separate user interfaces for display according an alternate embodiment of the present disclosure. In particular, a user obtains service from a service provider at a step 4902. The user subscribes to receive information content at a step 4904. The user selects a category of information to be displayed at a step 4906. A first portion of the information is displayed on a first display at a step 4908. The first portion of information can then be reviewed with a first user interface at a step 4910. A second portion of information is then displayed on a second display at a step 4912. The second portion of information can be reviewed with a second user interface at a step 4914.

Figure 50:
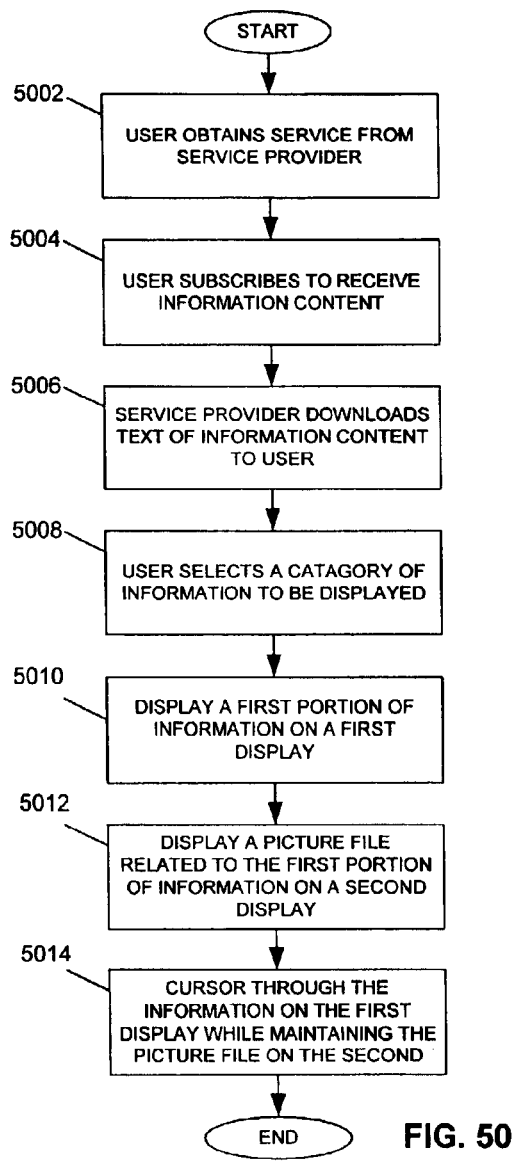
FIG. 50 is a flowchart showing a method of enabling a user to review information according to an alternate embodiment of the present invention.

Turning now to FIG. 50, a flowchart shows a method of enabling a user to review information according to an alternate embodiment of the present disclosure. A user obtains service from a service provider at a step 5002. The user subscribes to receive information content at a step 5004. The service provider downloads text of information content to a user at a step 5006. The user selects a category of information to be displayed at a step 5008. A first portion of information is displayed on a first display at a step 5010. A picture file related to the first information is displayed on a second display at a step 5012. The user then cursors through information on the first display while maintaining the picture file on a second display at a step 5014.

Figure 51:
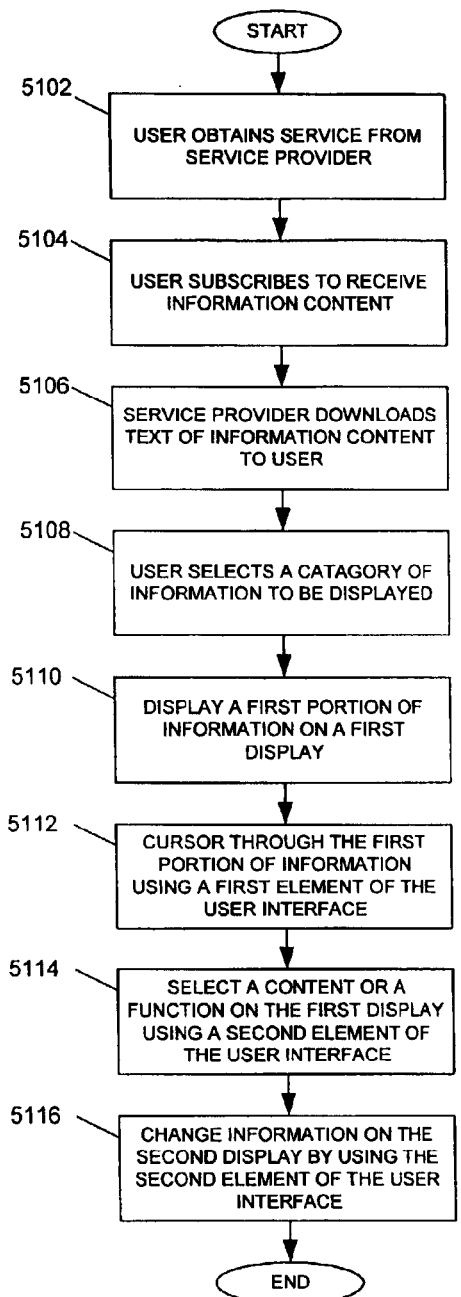
FIG. 51 is a flowchart showing a method of displaying information on a wireless communication device according to an alternate embodiment of the present invention.

Turning now to FIG. 51, a flowchart shows a method of displaying information on a wireless communication device according to an alternate embodiment of the present disclosure. A user obtains service from a service provider at a step 5102. The user subscribes to receive information content at a step 5104. The service provider downloads text of information content to a user at a step 5106. The user selects a category of information to be displayed at a step 5108. A first portion of information is displayed on a first display at a step

5110. In particular, a user cursors through first information using a first element of a user interface associated with the first display at a step 51. The user selects an option on the first display using a second element of a user interface at a step 5114. Information displayed on the second display is then changed at a step 5116.

Figure 52:
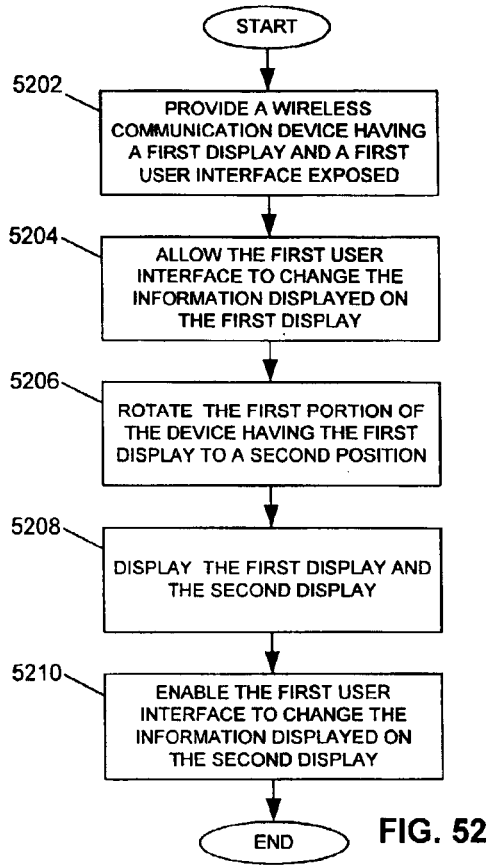
FIG. 52 is a flowchart showing a method of displaying information on a wireless communication device according to an alternate embodiment of the present invention.

Turning now to FIG. 52, a flowchart shows a method of displaying information on a wireless communication device according to an alternate embodiment of the present disclosure. In particular, a wireless communication device having a first display and a first user interface exposed when the wireless communication device is closed is shown at a step 5202. The first user interface enables a user to change the content of the first display at a step 5204. The first portion of the wireless communication device having the display is rotated to a second position at a step 5206. The first display and the second display are then viewable at a step 5208. Finally, the first user interface enables a user to change the information displayed on the second display at a step 5210.

Figure 53:
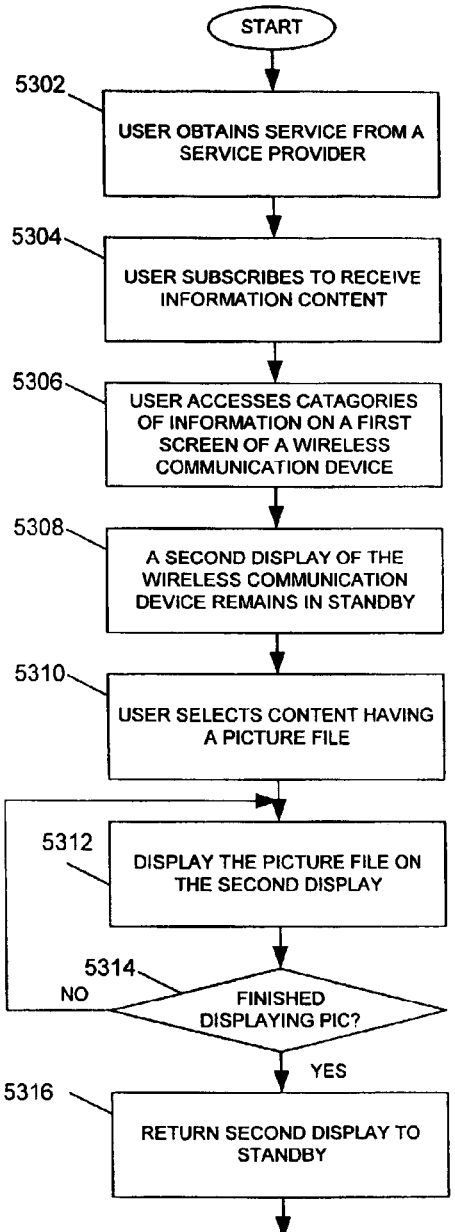
FIG. 53 is a flowchart showing a method of saving power when displaying content on a wireless communication device according to an alternate embodiment of the present invention.

Turning now to FIG. 53, a flowchart shows a method of saving power when displaying content on a wireless communication device according to an alternate embodiment of the present disclosure. A user obtains service from a service provider at a step 5302. The user subscribes to receive information content at a step 5304. The user accesses categories of information on the first screen of a wireless communication device at a step 5306. A second display of the wireless communication device remains in standby at a step 5308. Standby could be a blank screen or a low power operation of a display, such as displaying a standby screen in low brightness. The user then selects content having a related picture file at a step 5310. The picture file is then displayed on a second display at a step 5312. It is then determined whether the user is finished displaying the picture file at a step 5314. If so, the second display is returned to the low power, standby mode at a step 5316.

Figure 54:
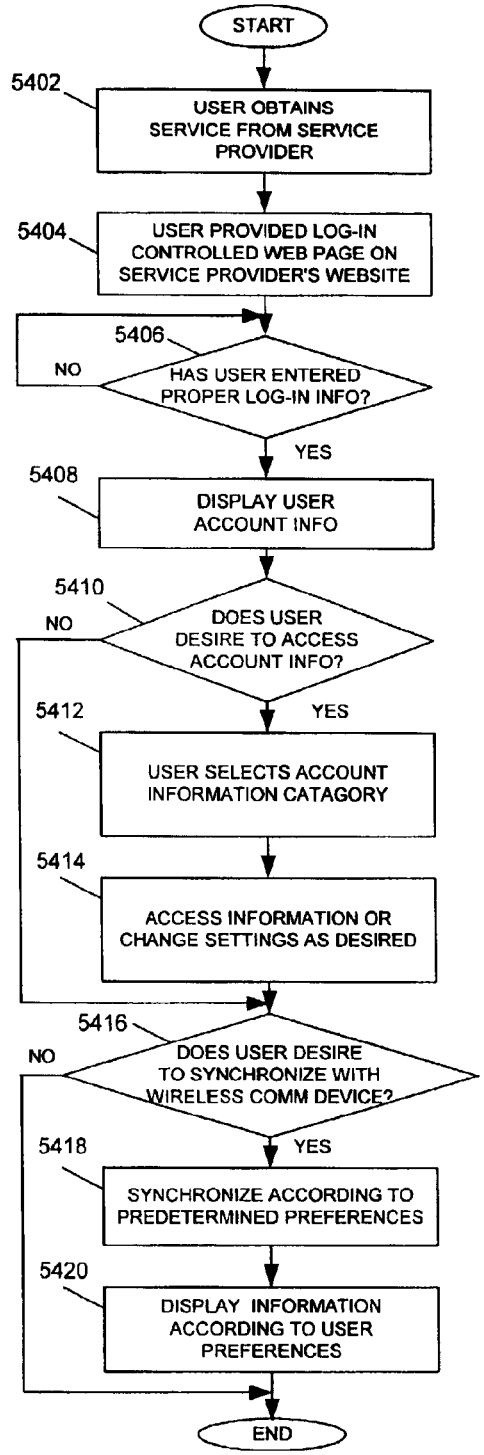
FIG. 54 is a flowchart showing a method of enabling remote access for services associated with a wireless communication device according to the present invention.

Turning now to FIG. 54, a flowchart shows a method of enabling a user to set or change options associated with service provided by the wireless service provider from a remote location. The user obtains service from a service provider at a step 5402. The user is provided with a log-in control webpage on the service provider's website at a step 5404. For example, the user would be required to provide a user name and PIN to access the webpage associated with the service. If the user had entered the proper log-in information at a step 5406, the user account information is provided on a computer at a step 5408. It is then determined whether the user desires to access account information at a step 5410. If so, the user selects an account information category, such as the features or content available and shown in FIG. 37. The user then accesses information or changes settings as desired at a step 5414. It is then determined whether the user desires to synchronize any changes with the wireless communication device at a step 5416. If so, the information is synchronized according to predetermined preferences at a step 5418. Such synchronization can be found in the application Ser. No. 60/378,631. Information is then displayed according to user preferences at a step 5420.

Figure 55:
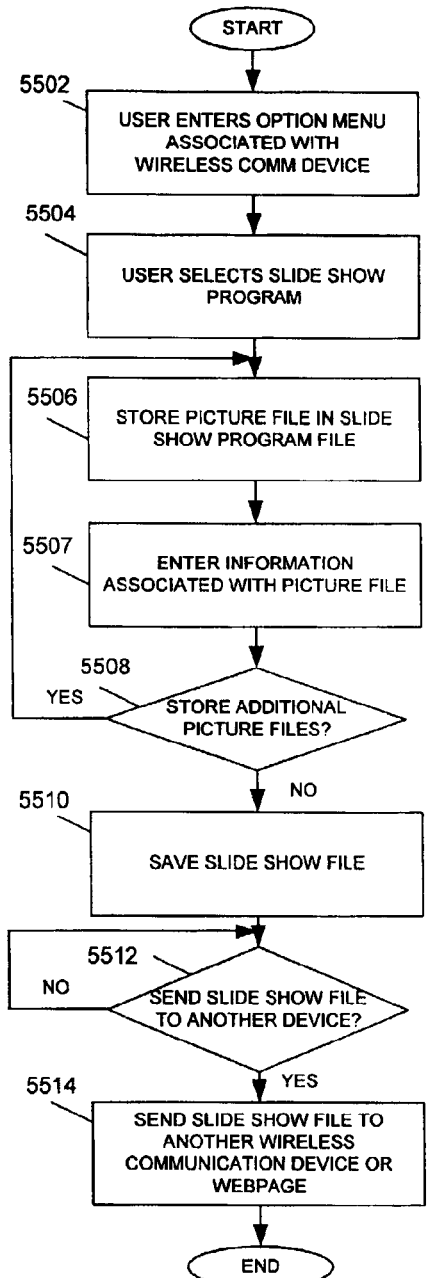
FIG. 55 is a flowchart showing a method of creating a slide show according to the present invention.

Turning now to FIG. 55, a flow chart shows a method of creating a slide show on a wireless communication device according to the present invention. In particular, a user enters an option menu associated with the wireless communication device at a step 5502. The user then selects a slide show program at a step 5504. The user then opens an existing slide show file or creates a new slide show file and saves a picture file to the new slide show at a step 5506. The user then preferably enters information associated with a new picture file at a step 5507. As shown in FIG. 41, the user can enter text manually using the keyboard, or using speech-to-text software. It is then determined whether additional picture files and information are intended to be stored at a step 5508. If not, the new slide show file is then saved at a step 5510. It is then determined whether the user desires to send the slide show at a step 5512. If so, the slide show is then transmitted to another device at a step 5514. The slide show could be sent by way of any of the communication links, such as any of the communication links from the wireless communication device 100 to any other device of FIG. 2.

For example, the new slide show could be transmitted from the wireless communication device 100 to the wireless communication device 256 by way of the wireless communication network. Assuming that the wireless communication device 100 is capable of displaying a slide show, the wireless communication device could open the slide show and display it on its display or plurality of displays. The wireless communication device 100 could then save the new slide show, or synchronize with its web page for saving at a different location. Similarly, a slide show could be created on a users website and coupled to a wireless communication device by way of any communication link of FIG. 2.

Figure 56:
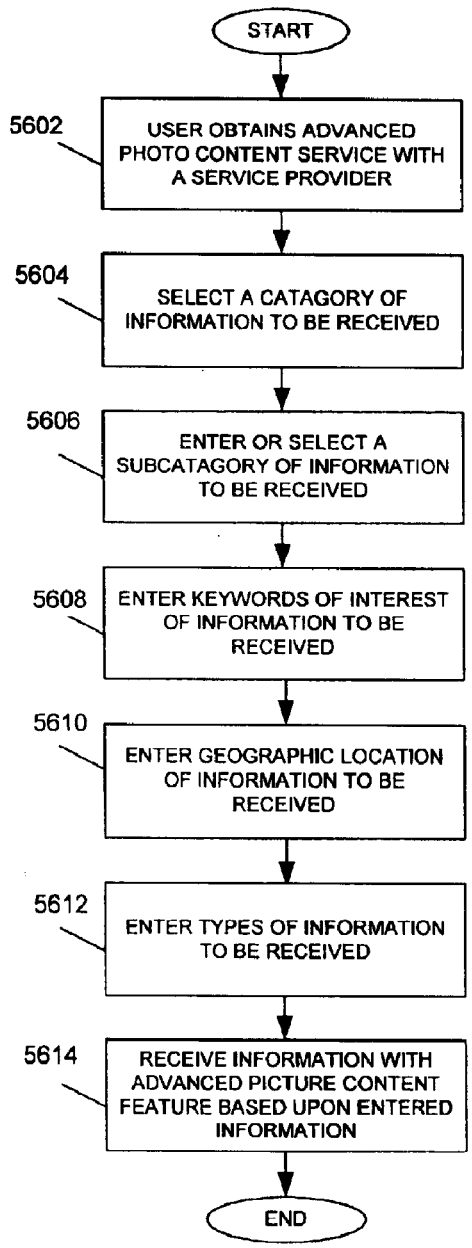
FIG. 56 is a flowchart showing a method of customizing content provided to a wireless communication device according to the present invention.
Figure 57:
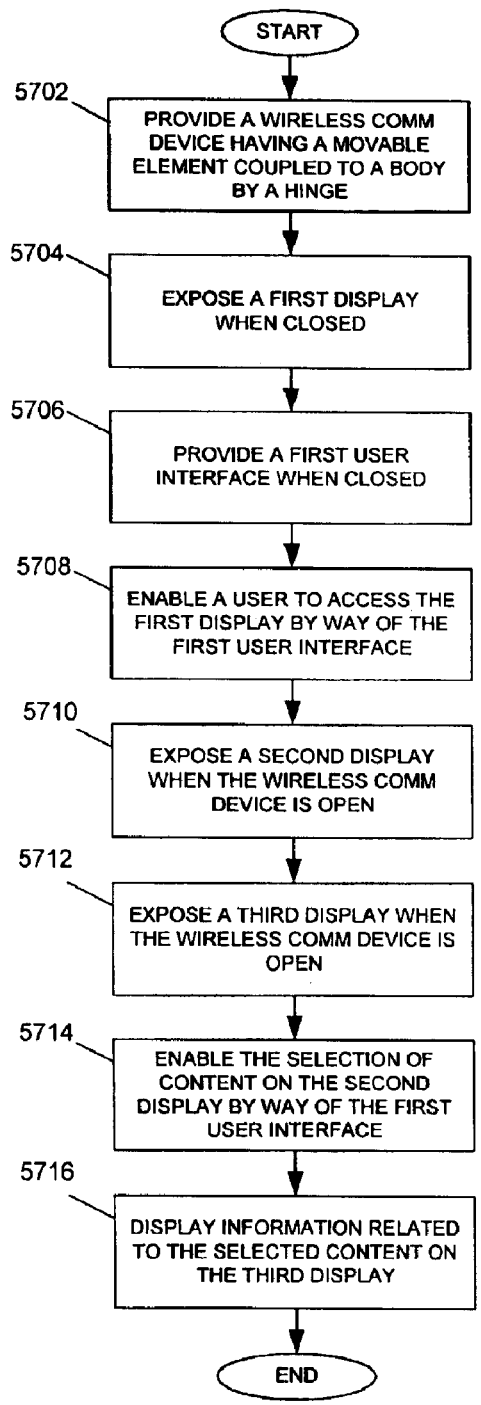
FIG. 57 is a flowchart showing a method of displaying information on a wireless communication device according to an alternate embodiment of the present invention.

Turning now to FIG. 56, a flow chart shows a method of customizing information content received by a wireless communication device according to the present invention. In particular, a user obtains information content service from a service provider at step 5602. The user then select a category of information to be received at a step 5604. The category of information could be associated with any advance picture content service, such as a screen saver, a slide show, location based information, or some other advance picture content feature. The user then enters or selects a subcategory of information to be received at a step 5606. The user may then enter key words of interest of information to be received at a step 5608. The user may then enter geographic location of information to be received at a step 5610. Finally, the user enters the type of information to be received at a step 5612. The user then receives the information with advance picture content feature based upon the entered information at a step 5614.

For example, the user may select a category of news, having a subcategory of local news, having a key word of interest being "politics". The user may then enter a geographic location of a certain city of interest, and enter the type of information such as "news articles" to be received. The entries could be manually entered by the user, or accessed from a pull-down menu of options established by the service provider. Accordingly, a user can tailor the information which is received for any one of the advanced picture content features, which may also enable an advertiser to provide better targeted advertisements. The customizing of information could be performed on the wireless communication device or a webpage accessible by the user and associated with the user's service, Turning now to FIG. 57, a flowchart shows a method of displaying content on a wireless communication device according to an alternate embodiment of the present disclosure. In particular, a wireless communication device is provided having a movable element coupled to a body by a hinge at a step 5702. A first display is exposed when the movable portion is closed at a step 5704. A first user interface is also provided when the movable portion is closed at a step 5706. A user is then able to access the first display by the first user interface at a step 5708. A second display is then exposed when the movable portion of the wireless communication device is opened in a step 5710. A third display is also simultaneously exposed when the movable portion is opened at a step 5712. The selection of content on the second display by way of the first user interface is enabled at a step 5714. Finally, information, such as a picture file related to the selection of content, is then displayed on the third display in a step 5716.

In summary, the present disclosure relates to a foldable wireless communication device functioning as a cellular telephone and a personal digital assistant. The foregoing discussion of the invention has been presented for purpose of illustration and description. Further, the description is not to limit the invention to the form disclosed herein. Consequently, variations and modifications commensurate with the above teachings within the skill and knowledge of the relevant art, are within the scope of the present invention. The embodiments discussed hereinabove are further intended to explain the best mode known of the invention and to enable others skilled in the art to utilize the invention in such, or in other, embodiments and with the various modification required by their application or uses of the invention. It is intended that the any claims to an invention be constructed to include alternative embodiments to the extent permitted by the prior art.

We claim:

1. A foldable wireless communication device functioning as a cellular telephone and a personal digital assistant, said wireless communication device comprising:
    a first body portion having a numeric keypad;
    a touch screen user interface positioned above said numeric keypad on a first side of said first body portion;
    a second body portion coupled by a hinge to said first body portion, said second body portion being movable between a closed position and an open position;
    a display positioned on said second body portion, said display comprising a touch screen and being responsive to said touch screen user interface positioned above said keypad;
    a user interface keypad on said second body portion adjacent said display, said user interface keypad enabling the selection of a PDA function of said wireless communication device; and
    a battery, separate from said touch screen user interface, accessible on a second side of said first body portion.

2. The wireless communication device of claim 1 further comprising a second display providing caller ID information when said second body portion is a closed position.

3. The wireless communication device of claim 1 further comprising a user interface actuator.

4. The wireless communication device of claim 3 wherein said user interface actuator is visible when said second body portion is in said closed position.

5. A foldable wireless communication device functioning as a cellular telephone and a personal digital assistant, said wireless communication device comprising:
    a first body portion;
    a second body portion coupled to said first body portion by a hinge, said second body portion being movable between a closed position and an open position;
    a touch screen user interface positioned adjacent to said hinge on a first side of said first body portion;
    a numeric keypad positioned on said first side of said first body portion below said touch screen user interface;
    a display positioned on said second body portion, said display comprising a touch screen and being further responsive to said touch screen user interface positioned on said first body portion;
    a user interface keypad on said second body portion adjacent said touch screen user interface; and
    a battery, separate from said touch screen user interface, accessible on a second side of said first body portion.

6. The wireless communication device of claim 5 further comprising a second display visible when said second body portion is in said closed position and displaying caller ID information.

7. The wireless communication device of claim 5 further comprising a GPS receiver.

8. The wireless communication device of claim 5 further comprising a removable memory card.

9. A foldable wireless communication device functioning as a cellular telephone and a personal digital assistant, said wireless communication device comprising:
    a first body portion;
    a second body portion coupled to said first body portion by a hinge, said second body portion being movable between a closed position and an open position;
    a touch screen user interface positioned on a first side of said first body portion adjacent to said hinge;
    a plurality of user interface actuator keys positioned on said first side of said first body portion below said touch screen user interface, said plurality of user interface actuator keys comprising a plurality of hard keys enabling the selection of predetermined functions of said wireless communication device;
    a numeric keypad positioned on said first side of said first body portion below said plurality of user interface actuator keys;
    a first display positioned on said second body portion, said first display being responsive to said touch screen user interface;
    a second display visible when said wireless communication device is in said closed position;
    a battery, separate from said touch screen user interface, positioned on a second side of said first body portion.

10. The wireless communication device of claim 9 further comprising an infrared port.

11. The wireless communication device of claim 10 further comprising a user interface actuator.

12. The wireless communication device of claim 11 wherein said user interface actuator is visible when said second body portion is in said closed position.

13. A foldable wireless communication device functioning as a cellular telephone and a personal digital assistant, said wireless communication device comprising:
    a first body portion;
    a second body portion coupled to said first body portion by a hinge, said second body portion being movable between an open position and a closed position;
    a touch screen user interface positioned on a first side of said first body portion adjacent to said hinge;
    a plurality of user interface actuator keys positioned on said first side of said first body portion below said touch screen user interface, said plurality of user interface actuator keys comprising a plurality of hard keys enabling the selection of predetermined functions of said wireless communication device;
    a numeric keypad positioned on said first side of said first body portion below said plurality of user interface actuator keys;

a first display positioned on said second body portion, said first display comprising a touch screen being further responsive to said touch screen user interface;

a second display visible when said second body portion is in said closed position, said second display providing caller ID information;

a removable memory card; and a battery, separate from said touch screen user interface, positioned on a second side of said first body portion.

14. The wireless communication device of claim 13 further a comprising GPS receiver.

15. The wireless communication device of claim 13 further comprising a microphone receiving voice signals.

16. The wireless communication device of claim 15 further comprising a voice recognition circuit responsive to said voice signals.

* * * * *